(12) United States Patent
Leppänen et al.

(10) Patent No.: US 10,416,872 B2
(45) Date of Patent: Sep. 17, 2019

(54) DETERMINATION OF AN APPARATUS DISPLAY REGION

(71) Applicant: Nokia Technologies Oy, Espoo (FI)

(72) Inventors: Jussi Leppänen, Tampere (FI); Miikka Vilermo, Siuro (FI); Arto Lehtiniemi, Lempäälä (FI); Antti Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 237 days.

(21) Appl. No.: 15/323,827

(22) PCT Filed: Jun. 24, 2015

(86) PCT No.: PCT/FI2015/050463
§ 371 (c)(1),
(2) Date: Jan. 4, 2017

(87) PCT Pub. No.: WO2016/005656
PCT Pub. Date: Jan. 14, 2016

(65) Prior Publication Data
US 2017/0139566 A1 May 18, 2017

(30) Foreign Application Priority Data
Jul. 8, 2014 (EP) .................................. 14176084

(51) Int. Cl.
*G06F 3/00* (2006.01)
*G06F 3/0486* (2013.01)
(Continued)

(52) U.S. Cl.
CPC .......... *G06F 3/0486* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

2006/0146765 A1* 7/2006 Van De Sluis ......... G06F 3/016
370/338
2011/0138317 A1 6/2011 Kang et al.
(Continued)

FOREIGN PATENT DOCUMENTS

| CN | 102402287 A | 4/2012 |
|---|---|---|
| CN | 102754060 A | 10/2012 |

(Continued)

OTHER PUBLICATIONS

Mira Kim et al., A Touch Based Affective User Interface for Smartphone, Jan. 1, 2013, IEEE, pp. 606-607 (Year: 2013).*
(Continued)

*Primary Examiner* — Tam T Tran
(74) *Attorney, Agent, or Firm* — Alston & Bird LLP

(57) ABSTRACT

A method comprising determining by an apparatus that comprises a see through display, that the apparatus has become placed on a separate apparatus, the separate apparatus comprising a separate apparatus display, determining an apparatus display region of the see through display based, at least in part, on the determination that the apparatus has become placed on the separate apparatus, determining a separate apparatus display region of the see through display, sending a display region directive from the apparatus to the separate apparatus that communicates the separate apparatus display region, receiving information indicative of an input, determining that the input has an input position that corresponds with the separate apparatus display region, and sending an operational directive from the apparatus to the separate apparatus based, at least in part, on the determina-
(Continued)

tion that the input has an input position that corresponds with the separate apparatus display region is disclosed.

20 Claims, 13 Drawing Sheets

(51) Int. Cl.
    *G06F 3/0488*   (2013.01)
    *G06F 3/0484*   (2013.01)
    *G06F 3/0482*   (2013.01)
    *G06F 3/14*   (2006.01)
    *G09G 5/12*   (2006.01)
    *G09G 5/14*   (2006.01)

(52) U.S. Cl.
    CPC .......... *G06F 3/0488* (2013.01); *G06F 3/1423* (2013.01); *G09G 5/12* (2013.01); *G09G 5/14* (2013.01); *G06F 2203/04804* (2013.01); *G09G 2354/00* (2013.01)

(56) References Cited

U.S. PATENT DOCUMENTS

| | | | |
|---|---|---|---|
| 2011/0249024 A1 | 10/2011 | Arrasvuori et al. | |
| 2011/0252320 A1 | 10/2011 | Arrasvuori et al. | |
| 2014/0040766 A1* | 2/2014 | Shigeta | H04M 1/7253 715/748 |
| 2014/0078089 A1* | 3/2014 | Lee | G06F 3/04883 345/173 |
| 2014/0123038 A1 | 5/2014 | Ahn et al. | |
| 2014/0357291 A1 | 12/2014 | Leppanen et al. | |

FOREIGN PATENT DOCUMENTS

| | | |
|---|---|---|
| CN | 102760038 A | 10/2012 |
| EP | 2178282 A1 | 4/2010 |
| JP | 2006-518507 A | 8/2006 |
| JP | 2011-248765 A | 12/2011 |
| JP | 2012-231245 A | 11/2012 |
| JP | 2012-248137 A | 12/2012 |
| WO | 2004/075169 A2 | 9/2004 |
| WO | 2010/078094 A1 | 7/2010 |
| WO | 2012/147292 A1 | 11/2012 |

OTHER PUBLICATIONS

Susumu Tsuhara, Automatic Window Rearrangement Using Fuzzy rules, Jan. 1, 1995, IEEE, pp. 682-686 (Year: 1995).*
Office action received for corresponding Japanese Patent Application No. 2017-500011, dated Nov. 13, 2017, 3 pages of office action and 2 pages of translation available.
Lucero et al., "Social and Spatial Interactions: Shared Co-Located Mobile Phone Use", CHI Extended Abstracts on Human Factors in Computing Systems, Apr. 12-13, 2010, pp. 3223-3228.
Office action received for corresponding European Patent Application No. 14176084.3, dated Aug. 22, 2017, 6 pages.
International Search Report and Written Opinion received for corresponding Patent Cooperation Treaty Application No. PCT/FI2015/050463, dated Sep. 17, 2015, 11 pages.
European Search Report for corresponding European Application No. 14176084.3, dated Jan. 14, 2015, 3 pages.
Chinese Office Action for Application No. 201580042462.2, dated May 29, 2019, 7 pages.
Chinese Search Report for Application No. 201580042462.2, 3 pages.

* cited by examiner

DETERMINATION OF AN APPARATUS DISPLAY REGION

RELATED APPLICATION

This application was originally filed as Patent Cooperation Treaty Application No. PCT/FI2015/050463 filed Jun. 24, 2015 which claims priority benefit to European Patent Application No. 14176084.3 filed Jul. 8, 2014.

TECHNICAL FIELD

The present application relates generally to determination of an apparatus display region.

BACKGROUND

As electronic apparatuses become increasingly prevalent in our society, it has increasingly become necessary for many users to operate multiple apparatus. For example, users are increasingly using their apparatuses to share files between an apparatus and a separate apparatus, to process information from an apparatus on a separate apparatus, to control an apparatus from a separate apparatus, and/or the like. As such, it may be desirable to configure an electronic apparatus such that a user of the electronic apparatus may interact with an apparatus, a separate apparatus, and/or the like, in an intuitive manner.

SUMMARY

Various aspects of examples of the invention are set out in the claims.

One or more embodiments may provide an apparatus, a computer readable medium, a non-transitory computer readable medium, a computer program product, and/or a method for determining by an apparatus that comprises a see through display, that the apparatus has become placed on a separate apparatus, the separate apparatus comprising a separate apparatus display, determining an apparatus display region of the see through display based, at least in part, on the determination that the apparatus has become placed on the separate apparatus, determining a separate apparatus display region of the see through display that is distinct from the apparatus display region, sending a display region directive from the apparatus to the separate apparatus that communicates the separate apparatus display region, receiving information indicative of an input, determining that the input has an input position that corresponds with the separate apparatus display region, and sending an operational directive from the apparatus to the separate apparatus based, at least in part, on the determination that the input has an input position that corresponds with the separate apparatus display region.

One or more embodiments may provide an apparatus, a computer readable medium, a computer program product, and/or a non-transitory computer readable medium having means for determining by an apparatus that comprises a see through display, that the apparatus has become placed on a separate apparatus, the separate apparatus comprising a separate apparatus display, means for determining an apparatus display region of the see through display based, at least in part, on the determination that the apparatus has become placed on the separate apparatus, means for determining a separate apparatus display region of the see through display that is distinct from the apparatus display region, means for sending a display region directive from the apparatus to the separate apparatus that communicates the separate apparatus display region, means for receiving information indicative of an input, means for determining that the input has an input position that corresponds with the separate apparatus display region, and means for sending an operational directive from the apparatus to the separate apparatus based, at least in part, on the determination that the input has an input position that corresponds with the separate apparatus display region.

An apparatus comprising at least one processor and at least one memory, the memory comprising machine-readable instructions, that when executed cause the apparatus to perform determination that the apparatus has become placed on a separate apparatus, the separate apparatus comprising a separate apparatus display, determination of an apparatus display region of the see through display based, at least in part, on the determination that the apparatus has become placed on the separate apparatus, determination of a separate apparatus display region of the see through display that is distinct from the apparatus display region, sending of a display region directive from the apparatus to the separate apparatus that communicates the separate apparatus display region, receipt of information indicative of an input, determination that the input has an input position that corresponds with the separate apparatus display region, and sending of an operational directive from the apparatus to the separate apparatus based, at least in part, on the determination that the input has an input position that corresponds with the separate apparatus display region.

In at least one example embodiment, the apparatus is placed on the separate apparatus such that the see through display substantially aligns with at least part of the separate apparatus display. In at least one example embodiment, the see through display aligns with the separate apparatus display such that information displayed on the separate apparatus display is visible through the see through display.

In at least one example embodiment, the determination that the apparatus has become placed on the separate apparatus comprises determination that the apparatus has become placed on the separate apparatus such that the see through display aligns with at least part of the separate apparatus display.

In at least one example embodiment, the determination that the apparatus has become placed on the separate apparatus such that the see through display aligns with at least part of the separate apparatus display comprises determination that the apparatus has become placed on the separate apparatus such that information displayed on the separate apparatus display is visible through the see through display.

In at least one example embodiment, the separate apparatus display region fails to overlap the apparatus display region.

In at least one example embodiment, the apparatus display region is a region of the see through display that is allocated to interaction with the apparatus.

In at least one example embodiment, the separate apparatus display region is a region of the see through display that is allocated to interaction with the separate apparatus.

In at least one example embodiment, information displayed by the separate apparatus is viewable through the separate apparatus display region.

One or more example embodiments further perform determination that the see through display is displaying information within the separate apparatus display region, and termination of display of the information in the separate apparatus display region based, at least in part, on the determination that the information is within the separate apparatus display region.

In at least one example embodiment, terminating display of the information in the separate apparatus display region comprises moving the information from the separate apparatus display region to the apparatus display region.

In at least one example embodiment, the display region directive is configured to instruct the separate apparatus to display information such that the information aligns with the separate apparatus display region.

In at least one example embodiment, dimensions of the separate apparatus display are substantially equal dimensions of the see through display, the determination that the apparatus has been placed on the separate apparatus comprises determination that the see through display substantially aligns with the separate apparatus display, and the display region directive indicates a position of the separate apparatus display region and dimensions of the separate apparatus display region.

In at least one example embodiment, the separate apparatus display has substantially different dimensions as the see through display.

One or more example embodiments further perform identification of a position on the separate apparatus display that substantially aligns with a position of the separate apparatus display region, and identification of dimensions on the separate apparatus display that substantially align with dimensions of the separate apparatus display region, wherein the display region directive indicates the position on the separate apparatus display and the dimensions on the separate apparatus display.

In at least one example embodiment, the display region directive is configured to instruct the separate apparatus to terminate display of information that aligns with the apparatus display region.

In at least one example embodiment, the operational directive is configured to instruct the separate apparatus to perform an operation that corresponds with the input.

In at least one example embodiment, the operational directive comprises information indicative of at least one aspect of the input.

In at least one example embodiment, the aspect of the input is at least one of the input position, an input duration, or an input type.

In at least one example embodiment, the input is a selection input, and the operational directive comprises information indicative of the selection input at the input position.

In at least one example embodiment, the input is a drag input that comprises a start position that corresponds with the apparatus display region and an end position that corresponds with the separate apparatus display region, One or more example embodiments further perform identification of an interface element that corresponds with the start position, wherein the operational directive comprises information associated with the interface element.

In at least one example embodiment, the determination that the input position corresponds with the separate apparatus display region comprises determination that the end position corresponds with the separate apparatus display region.

In at least one example embodiment, the interface element is associated with data stored in memory of the apparatus, and the operational directive instructs the separate apparatus to copy at least part of the data.

In at least one example embodiment, the operational directive comprises the data.

In at least one example embodiment, the input is a drag input that comprises a start position that corresponds with the separate apparatus display region and an end position that corresponds with the apparatus display region, and the operational directive is configured to instruct the separate apparatus to identify data associated with the start position and to send the data to the apparatus.

In at least one example embodiment, the determination that the input position corresponds with the separate apparatus display region comprises determination that the start position corresponds with the separate apparatus display region.

One or more example embodiments further perform receiving the data from the separate apparatus.

In at least one example embodiment, the end position corresponds with an interface element.

One or more example embodiments further perform invocation of an operation associated with the interface element such that the operation utilizes the data.

One or more example embodiments further perform identification of the interface element that corresponds with the end position wherein the invocation of the operation associated with the interface element is based, at least in part, on the identification of the interface element.

One or more example embodiments further perform causation of storage of the data.

One or more example embodiments further perform determination that the apparatus is no longer placed on the separate apparatus, and sending of a display region termination directive from the apparatus to the separate apparatus that communicates termination of the separate apparatus display region based, at least in part, on the determination that the apparatus is no longer placed on the separate apparatus.

One or more example embodiments further perform causation of display of information at a position that corresponds with the separate apparatus display region based, at least in part, on the determination that the apparatus is no longer placed on the separate apparatus.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
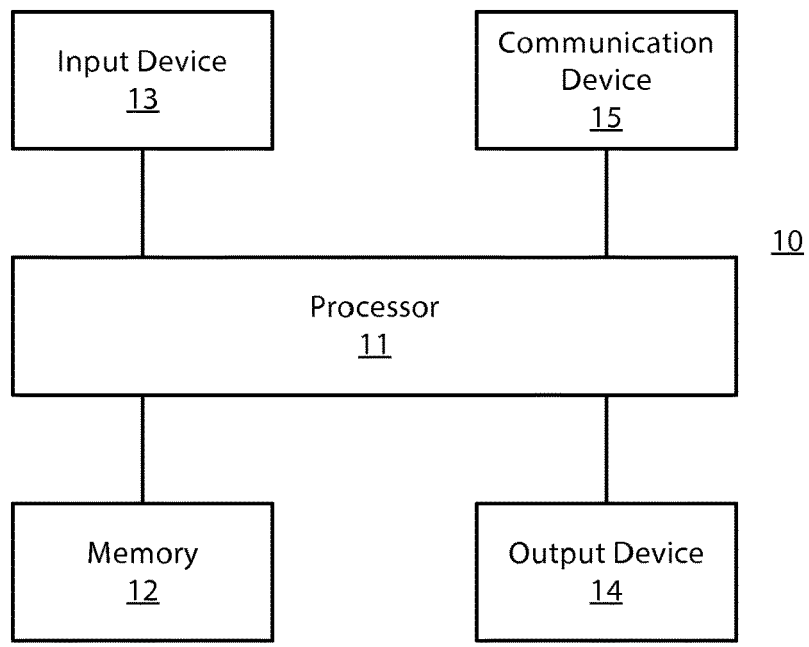
FIG. 1 is a block diagram showing an apparatus according to at least one example embodiment.

An embodiment of the invention and its potential advantages are understood by referring to FIGS. 1 through 13 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a see through display, a wearable apparatus, a head worn apparatus, a head mounted display apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
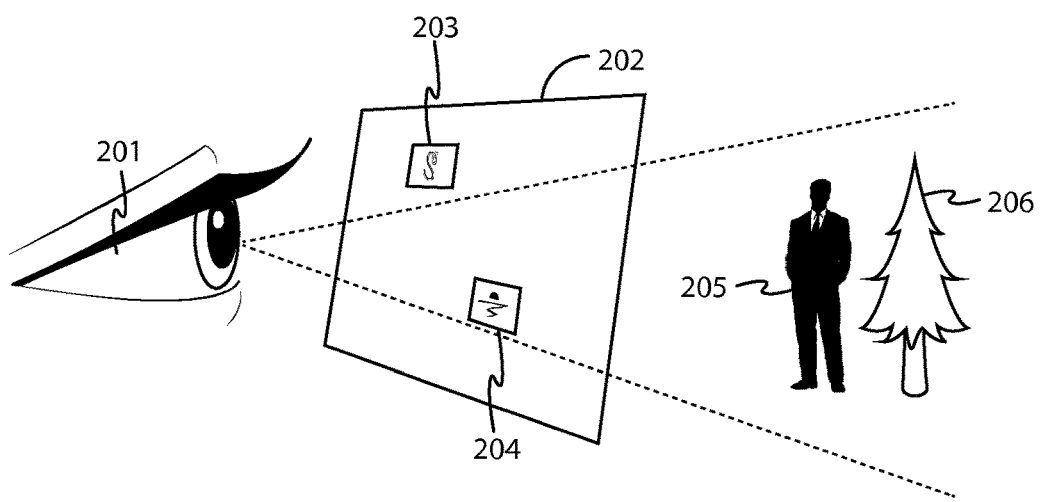
FIG. 2 is a diagram illustrating a see through display according to at least one example embodiment.

FIG. 2 is a diagram illustrating a see through display according to at least one example embodiment. The example of FIG. 2 is merely an example and does not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. For example, an object on the opposite side of the display may be perceivable through the see through display. A see through display may be comprised by a mobile phone, a tablet computer, a window, a windshield, a visor, glasses, a head mounted display, and/or the like.

FIG. 2 is a diagram illustrating see through display 202 according to at least one example embodiment. In at least one example embodiment, displaying information on a see through display so that the information corresponds with one or more objects viewable through the see through display is referred to as augmented reality. In the example of FIG. 2, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. For example, information 204 may be displayed at a position on display 202 such that information 204 is aligned with a line of sight between user 201 and object 206. For example, user 201 may perceive information 204 to be overlapping object 206, to partially correspond with object 206 in the user's field of view through display 202, and/or the like. In such an example, information 203 may be associated with, identify, and/or the like, object 205. For example, information 203 may indicate an identity of object 205. In at least one example embodiment, display 202 may be a window comprised by a vehicle, a building, and/or the like. In at least one example embodiment, a field of view of the user is a region of space that is perceivable by the user. In such an example, the field of view of the user may correspond with a field of view of the user through the see through display. For example, the field of view of the user through the display may encompass one or more objects viewable through the see through display. For example, object 205 and object 206 may be within the field of view of user 201 through see through display 202.

Figure 3A:
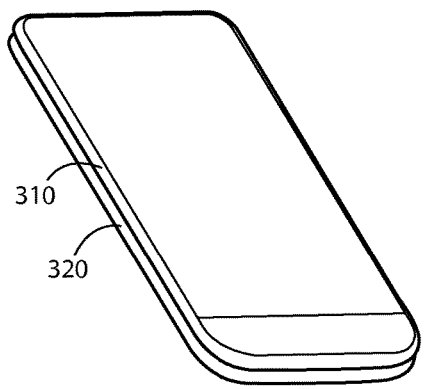
FIGS. 3A-3C are diagrams illustrating placement of an apparatus on a separate apparatus according to at least one example embodiment.
Figure 3B:
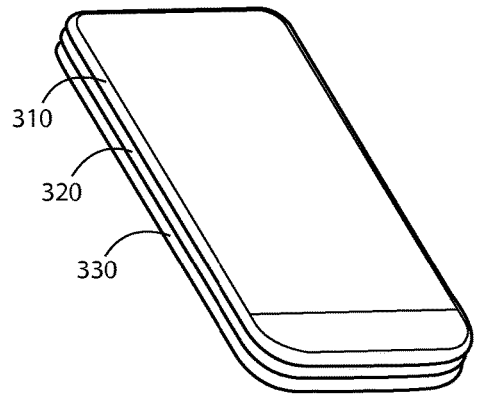
Figure 3C:
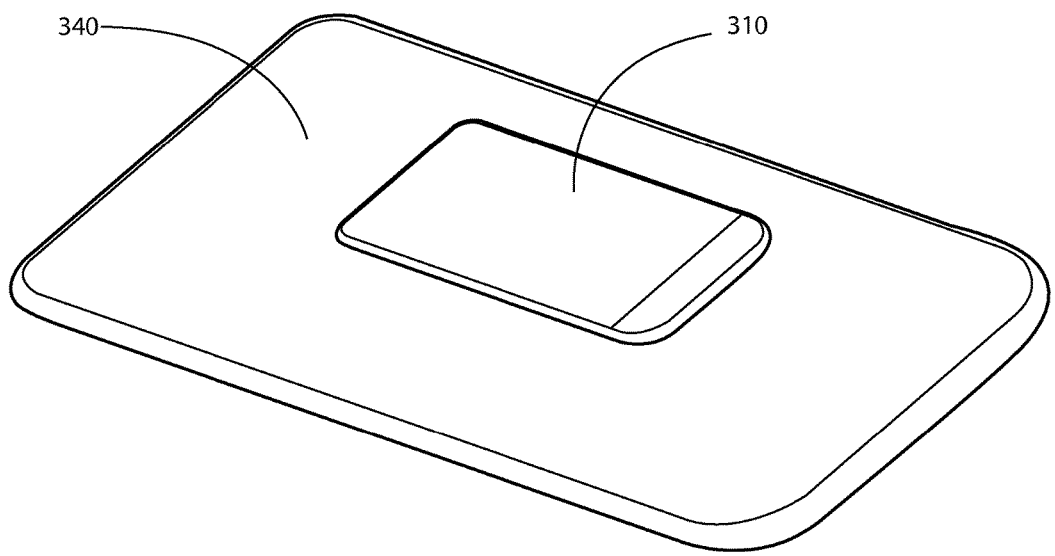

FIGS. 3A-3C are diagrams illustrating placement of an apparatus on a separate apparatus according to at least one example embodiment. The examples of FIGS. 3A-3C are merely examples and do not limit the scope of the claims. For example, the number of apparatuses may vary, the size of apparatus may vary, the type of apparatus may vary, and/or the like.

Oftentimes, it may be desirable to place an apparatus on a separate apparatus for interaction between the apparatus and the separate apparatus. For example, a user may place an apparatus on a separate apparatus for purposes relating to charging of the apparatus, storing of the apparatus, transferring data between the apparatus and the separate apparatus, and/or the like. For example, one or more operations may be based, at least in part, on proximity of the apparatus to the separate apparatus. In such an example, placing the apparatus on the separate apparatus may invoke one or more operations associated with the apparatus, the separate apparatus, and/or the like. In some circumstances, the separate apparatus may comprise a display. In such circumstances, placement of the apparatus on the separate apparatus may obstruct, at least a portion of, the display comprised by the separate apparatus. As such, it may be desirable to configure an apparatus such that a user of the apparatus may view information displayed on a separate apparatus display when the apparatus is placed on the separate apparatus. For example, when an apparatus comprises a see through display and the separate apparatus comprises a separate apparatus display, it may be desirable for a user to view the separate apparatus display through the see through display. In circumstances such as these, placement of the apparatus on the separate apparatus may facilitate such viewing by a user of the apparatus. Placement of an apparatus on a separate apparatus refers to positioning the apparatus in a manner such that the apparatus is in proximity to the separate apparatus. Placement of an apparatus on a separate apparatus does not require that the apparatus and the separate apparatus come into physical contact. In at least one example embodiment, an apparatus is placed on a separate apparatus when the apparatus is oriented such that the apparatus and the separate apparatus are in an alignment. In at least one example embodiment, an apparatus and a separate apparatus are in alignment when at least a portion of information displayed on the separate apparatus display is visible through the see through display. In some circumstances, an apparatus may be placed on a separate apparatus such that a see through display of the apparatus faces in the same direction as a separate apparatus display of the separate apparatus. For example, if the separate apparatus display is not a see through display, the separate apparatus display may be placed in alignment when the see through display is in front of the viewable region of the separate apparatus display. However, in some circumstances, the separate apparatus display may be a see through display. In circumstances such as these, the displays may be in alignment when the displays are placed back to back. In at least some circumstances, a see through display and a separate apparatus display may be substantially aligned. Substantial alignment refers to any deviation from perfect alignment which may not be noticeable to a user of the apparatus. Perfect alignment refers to an orientation between a see through display and a separate apparatus display such that the viewable region of the see through display and the viewable region of the separate apparatus display are in parallel planes and at least a portion of information displayed on the separate apparatus display is visible through the see through display. For example, the viewable region of the see through display and the viewable region of the separate apparatus display may be in substantially parallel planes. In such an example, the viewable regions may be in substantially parallel planes if the planes are parallel within a tolerance, such as a manufacturing tolerance, as permitted by a configuration of the apparatus and/or the separate apparatus, as permitted by a design of the apparatus and/or the separate apparatus, and/or the like. Substantial alignment does not require complete overlap of the see through display and the separate apparatus display. For example, the see through display may only partially overlap the separate apparatus display, the apparatus may be aligned in a different orientation than the separate apparatus, and/or the like.

The example of FIG. 3A illustrates apparatus 310. Apparatus 310 comprises a see through display. Apparatus 310 is placed on separate apparatus 320. Separate apparatus 320 comprises a separate apparatus display. The separate apparatus display of apparatus 320 is a see through display in the example of FIG. 3A, however a separate apparatus display may be any type of display. Placement of an apparatus on a separate apparatus is not limited to the orientation of example of FIG. 3A. For example, apparatus 310 and/or apparatus 320 may be oriented in a portrait orientation, a landscape orientation, and/or any other orientation, such that apparatus 310 is still placed on 320. In another example, apparatus 310 may be placed such that apparatus 310 is rotated ninety degrees from the orientation illustrated in FIG. 3A and still in alignment with separate apparatus 320. In the example of FIG. 3A, apparatus 310 is in substantial alignment with separate apparatus 320.

In at least some circumstances, it may be desirable to place multiple apparatus on each other. For example, when an apparatus and a separate apparatus each comprise a see through display, a user may wish to view information on each of the see through displays, and view information on another separate apparatus comprising a display. In circumstances such as these, placement of the apparatus on the separate apparatus and placement of the separate apparatus on the other separate apparatus may facilitate such viewing by a user of the apparatus.

The example of FIG. 3B illustrates apparatus 310 and separate apparatus 320 as previously described in FIG. 3A. Apparatus 310 is placed on separate apparatus 320. Separate apparatus 320 is placed on separate apparatus 330. Other separate apparatus 330 comprises a separate apparatus display. In the example of FIG. 3A, apparatus 310 is in substantial alignment with separate apparatus 320, and separate apparatus 310 is in substantial alignment with other separate apparatus 330.

In at least some circumstances, dimensions of the separate apparatus display are substantially equal dimensions of the see through display. Substantially equal dimensions refers to any deviation from exactly the same dimensions which may not be noticeable by a user of the apparatus. For example, an apparatus and a separate apparatus may be similar types of apparatus. For instance, the apparatus and the separate apparatus may be mobile phones of an identical model, similarly configured and/or dimensioned tablet computers, and/or the like. In at least some circumstances, an apparatus and a separate apparatus may be different types of apparatus. For example, the apparatus may be a mobile phone, and the separate apparatus may be a tablet computer. In another example, the apparatus and the different apparatus may both be mobile phones, but may be of a different size and/or shape. In circumstances such as these, the separate apparatus display may have substantially different dimensions than the see through display. Substantially different dimensions refers to any deviation from exactly the same dimensions which may be noticeable by a user of the apparatus. In circumstances such as these, the apparatus may still be placed on the separate apparatus.

The example of FIG. 3C illustrates apparatus 310 as previously described. Apparatus 310 is placed on separate apparatus 340. Separate apparatus 340 comprises a separate apparatus display. It can be seen in FIG. 3C that apparatus 310 is an apparatus of a different size than separate apparatus 340. Apparatus 310 and separate apparatus 340 are in substantial alignment. It can be seen in the example of FIG. 3C that apparatus 310 does not completely overlap apparatus 340. It can be seen in the example of FIG. 3C that the see through display of apparatus 310 has substantially different dimensions than the separate apparatus display of separate apparatus 340.

In at least some circumstances, it may be desirable for an apparatus comprising a see through display to determine that the apparatus has become placed on a separate apparatus comprising a separate apparatus display. For example, upon determining that the apparatus has become placed on a separate apparatus, the apparatus may adjust the information displayed on the see through display such that the information does not obscure separate information displayed on the separate apparatus display. In at least one example embodiment, determination that the apparatus has become placed on the separate apparatus comprises determination that the apparatus has become placed on the separate apparatus such that the see through display aligns with at least part of the separate apparatus. For example, the apparatus may determine that the apparatus has become placed on the separate apparatus based, at least in part, on a determination that information displayed on the separate apparatus display is visible through the see through display. In such an example, the apparatus may determine that the apparatus has become placed on the separate apparatus based, at least in part, on a determination that the see through display substantially aligns with at least part of the separate apparatus display. In at least one example embodiment, the apparatus may determine that the apparatus has become placed on a separate apparatus via one or more accelerometers, Bluetooth communication, near field communication, one or more position sensors, one or more image sensors, one or more light sensors, one or more proximity sensors, and/or the like.

In at least some circumstances, it may be desirable for the apparatus to determine the number of separate apparatus that the apparatus is placed on. For example, the apparatus may alter the display of information displayed on the see through display in a different manner in circumstances in which the apparatus is placed on three apparatus than in circumstances in which the apparatus is placed on two apparatus, a single apparatus, and/or the like. In the example of FIG. 3A, apparatus 310 may determine that apparatus 310 is placed on a single separate apparatus. In the example of FIG. 3B, apparatus 310 may determine that apparatus 310 is placed on two separate apparatus.

In at least some circumstances, it may be desirable for the apparatus to determine it is no longer placed on the separate apparatus. For example, the apparatus may be permitted to display information on the see through display in a manner that obscures viewing information through the see through display when the apparatus is no longer placed on the separate apparatus. In at least one example embodiment, the apparatus determines that the apparatus is no longer placed on the separate apparatus.

Figure 4A:
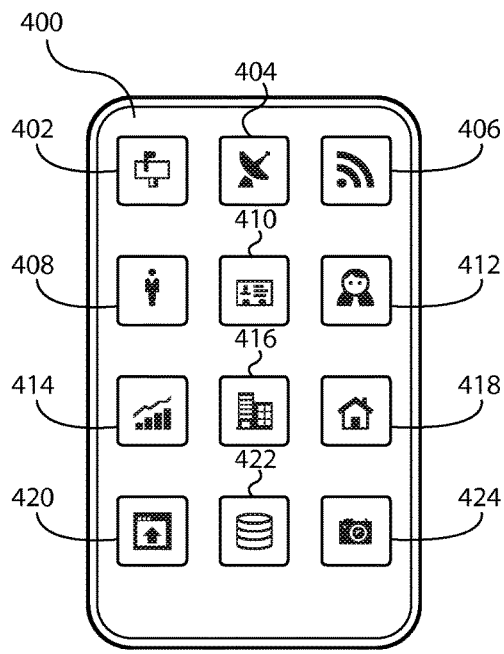
FIGS. 4A-4C are diagrams illustrating display regions according to at least one example embodiment.
Figure 4B:
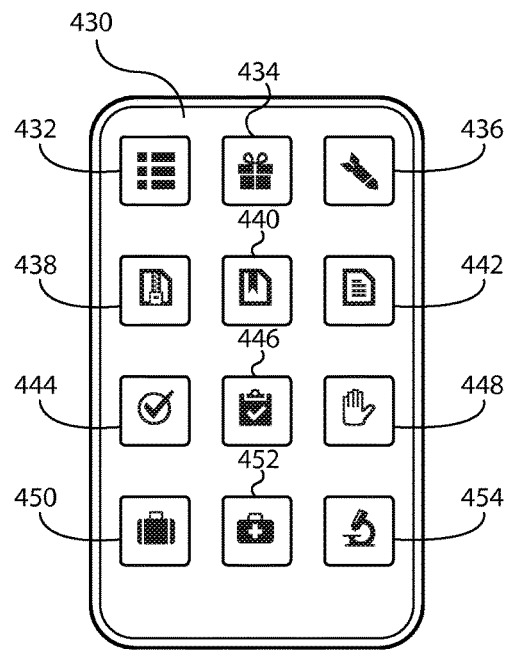
Figure 4C:
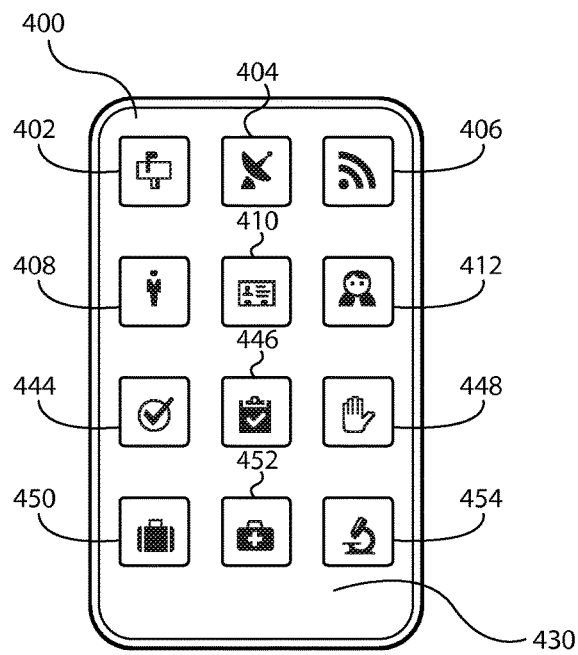

FIGS. 4A-4C are diagrams illustrating display regions according to at least one example embodiment. The examples of FIGS. 4A-4C are merely examples and do not limit the scope of the claims. For example, the number of display regions may vary, the location of the display regions may vary, the size of the display regions may vary, and/or the like.

When an apparatus comprising a see through display has determined that it has been placed on a separate apparatus comprising a separate apparatus display, it may be desirable to determine an apparatus display region of the see through display. Similarly, it may be desirable to determine a separate apparatus display region of the see through display that is distinct from the apparatus display region. An apparatus display region may refer to a region of a see through display that is allocated to interaction with the apparatus. A separate apparatus display region may refer to a region of a see through display that is allocated to interaction with the separate apparatus by way of the apparatus. For example, the apparatus may adjust the information displayed on the see through display such that the information does not obscure separate information displayed on the separate apparatus display. This may be accomplished by limiting display of information on the see through display to display within the apparatus region and/or precluding display of information on the see through display within the separate apparatus display region. In at least one example embodiment, determining an apparatus display region of the see through display is based, at least in part, on the determination that the apparatus has become placed on the separate apparatus. In at least one example embodiment, determination of a separate apparatus display region of the see through display is based, at least in part, on the determination of an apparatus display region of the see through display. In at least one example embodiment, the separate apparatus display region fails to overlap the apparatus display region. For example, the separate apparatus display region may be a region that is distinct from the apparatus display region.

In some circumstances, it may be desirable to determine that the see through display is displaying information within the separate apparatus display region. Information is displayed within a separate apparatus display region when the information is within a position bounded by the dimensions of the separate apparatus display region. For example, when information is displayed within the separate apparatus display region of the apparatus, the information may obscure other information beyond the see through display. For example, the information may obscure other information that would otherwise be viewable through the separate apparatus display region. For example, the other information may be information that is displayed on the separate apparatus display in a manner that corresponds with viewing through the separate apparatus display region. In such circumstances, it may be desirable to avoid display of information within the separate apparatus display region in a manner that obscures other information that is displayed on the separate apparatus display. In circumstances such as these, it may be desirable to terminate display of the information in the separate apparatus display region based, at least in part, on the determination that the information is within the separate apparatus display region. In this manner, information viewed through the see through display region may no longer be obscured. In some circumstances, it may be desirable to send a display region directive from the apparatus to the separate apparatus. The display region directive may, for example, communicate the separate apparatus display region of the apparatus to the separate apparatus. A display region directive may refer to a directive that communicates how information should be displayed by an apparatus, a separate apparatus, and/or the like. For example, an apparatus may send a display region directive that communicates the position, the dimensions, and/or the like, of the separate apparatus display region to the separate apparatus. In such an example, the display region directive may instruct the separate apparatus to avoid displaying information such that it may be obscured by information displayed on the see through display. The instruction may be a message, a command, and/or the like. In this manner, the separate apparatus may limit display of information to a region of the separate apparatus display that can be viewed through the separate apparatus display region of the see through display, the separate apparatus may avoid displaying information in a region of the separate apparatus display that cannot be viewed through the separate apparatus display region, and/or the like. In at least one example embodiment, the display region directive is configured to instruct the separate apparatus to display information such that the information aligns with the separate apparatus display region. In at least one example embodiment, the display region directive indicates a position of the separate apparatus display region and dimensions of the separate apparatus display region. In at least one example embodiment, dimensions of the separate apparatus display are substantially equal to dimensions of the see through display. In at least one example embodiment, the display region directive is configured to instruct the separate apparatus to terminate display of information that aligns with the apparatus display region. Information that aligns with the apparatus display region may refer to information that is displayed on the separate apparatus display that may be obscured when information is displayed within the apparatus display region.

FIG. 4A illustrates a separate apparatus 400. Apparatus 400 comprises a separate apparatus display. In the example of FIG. 4A, the separate apparatus display of apparatus 400 is displaying separate apparatus display information elements 402, 404, 406, 408, 410, 412, 414, 416, 418, 420, 422, and 424. FIG. 4B illustrates an apparatus 430. Apparatus 430 comprises a see through display. In the example of FIG. 4B, the see through display of apparatus 430 is displaying see through display information elements 432, 434, 436, 438, 440, 442, 444, 446, 448, 450, 452, and 454. Apparatus 430 and separate apparatus 400 are of a similar size and shape such that dimensions of the separate apparatus display are substantially equal dimensions of the see through display.

FIG. 4C illustrates apparatus 430 placed on separate apparatus 400, similar to the placement of apparatus 310 on separate apparatus 320 in FIG. 3A. In the example of FIG. 4C, apparatus 430 is displaying see through display information elements 444, 446, 448, 450, 452, and 454 in an apparatus display region of the see through display. In the example of FIG. 4C, apparatus 400 is displaying separate apparatus display information elements 402, 404, 406, 408, 410, and 412, which are visible through a separate apparatus display region of the see through display of apparatus 430. In the example of FIG. 4C, apparatus 430 has terminated display of see through display information elements 432, 434, 436, 438, 440, and 442. In the example of FIG. 4C, separate apparatus 400 has terminated display of separate apparatus display information elements 414, 416, 418, 420, 422 and 424. In this manner, see through display information elements 432, 434, 436, 438, 440, and 442 may fail to obscure viewing of separate apparatus display information elements 402, 404, 406, 408, 410, and 412, and separate apparatus display information elements 414, 416, 418, 420, 422 and 424 may fail to be obscured by see through display information elements 444, 446, 448, 450, 452, and 454. As can be seen in the example of FIG. 4C, the apparatus display region and the separate apparatus display region are of equal size.

In some circumstances, terminating display of the information displayed at a position that corresponds with separate apparatus display region may comprise repositioning the information from the separate apparatus display region to the apparatus display region. For example, the apparatus may rearrange the information displayed on the see through display, reposition the information displayed on the see through display, and/or the like, such that information that was previously displayed within the separate apparatus display region appears within the apparatus display region. For example, apparatus 430 of FIG. 4B may reposition see through display information elements 432, 434, 436, 438, 440, and 442 at a different position such that the see through display information elements occupy the region in which see through display elements 444, 446, 448, 450, 452, and 454 are displayed. In some circumstances, terminating display of the information in a separate apparatus display region may comprise a determination of relevant content. Relevant content may refer to content displayed on the separate apparatus display that is related to content displayed on the see through display. For example, relevant content may be content that is associated with a similar subject matter, a common application, and/or the like. For example, some of the information displayed on the separate apparatus display and viewable through the separate apparatus display region may be related to information displayed on the see through display. In circumstances such as these, the apparatus may move the related information to the separate apparatus display region, and terminate the display of unrelated information. The order of the content displayed on the apparatus display region may then be reordered in a predetermined manner, such that the most relevant information displayed within the apparatus display region is displayed near the separate apparatus display region. In some circumstances, the apparatus display region and the separate apparatus display region may be of equal size. For example, when the apparatus and the separate apparatus are of similar type, it may be desirable to allocate similar sizes to the apparatus display region and the separate apparatus display region. In some circumstances, it may be desirable for the apparatus display region and the separate apparatus display region to be of a size based on content. For example, in circumstances in which the separate apparatus display displays a greater amount of information than the see through display, it may be desirable to dimension the separate apparatus display region such that the separate apparatus display region is larger than the apparatus display region such that more content on the separate apparatus display may be viewable through the see through display. Alternatively, for example, in circumstances in which the separate apparatus display displays a lesser amount of information than the see through display, it may be desirable to dimension the separate apparatus display region such that the separate apparatus display region is smaller than the apparatus display region such that more content may be viewable on the see through display.

As previously described, an apparatus may determine that the apparatus is no longer placed on the separate apparatus. In circumstances such as these, it may be desirable to send a display region termination directive from the apparatus to the separate apparatus. A display region termination directive may be a message that communicates termination of the separate apparatus display region by the apparatus. For example, the display region termination directive may inform the separate apparatus that the separate apparatus may display information on the separate apparatus display without regard to the apparatus. For instance, separate apparatus 400 may revert to the configuration illustrated in the example of FIG. 4A. In at least one example embodiment, the apparatus sends a display region termination directive from the apparatus to the separate apparatus that communicates termination of the separate apparatus display region. In this manner, the sending may be based, at least in part, on the determination that the apparatus is placed on the separate apparatus. In some circumstances, after an apparatus is no longer placed on the separate apparatus, it may be desirable to cause display of information at a position that corresponds with the separate apparatus display region. For example, when the apparatus is no longer placed on the separate apparatus, the see through display can transition back to a full screen mode. For instance, apparatus 430 may revert to the configuration illustrated in the example of FIG. 4B. In another example, apparatus 430 may display new information in the position that corresponds with the separate apparatus display region.

Figure 5A:
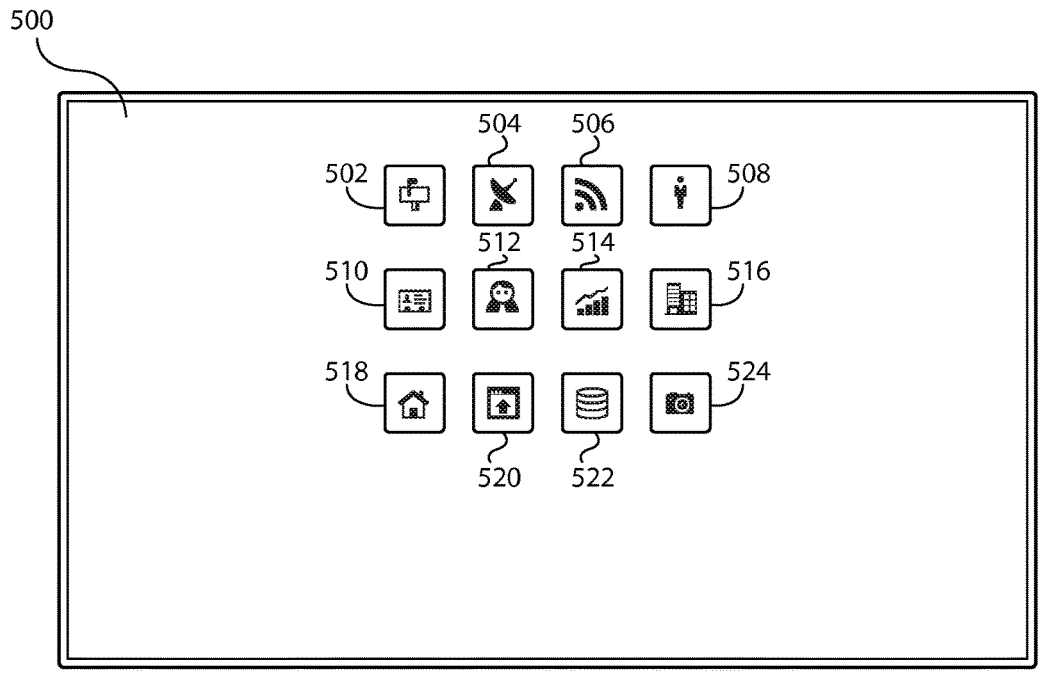
FIGS. 5A-5C are diagrams illustrating display regions according to at least one example embodiment.
Figure 5B:
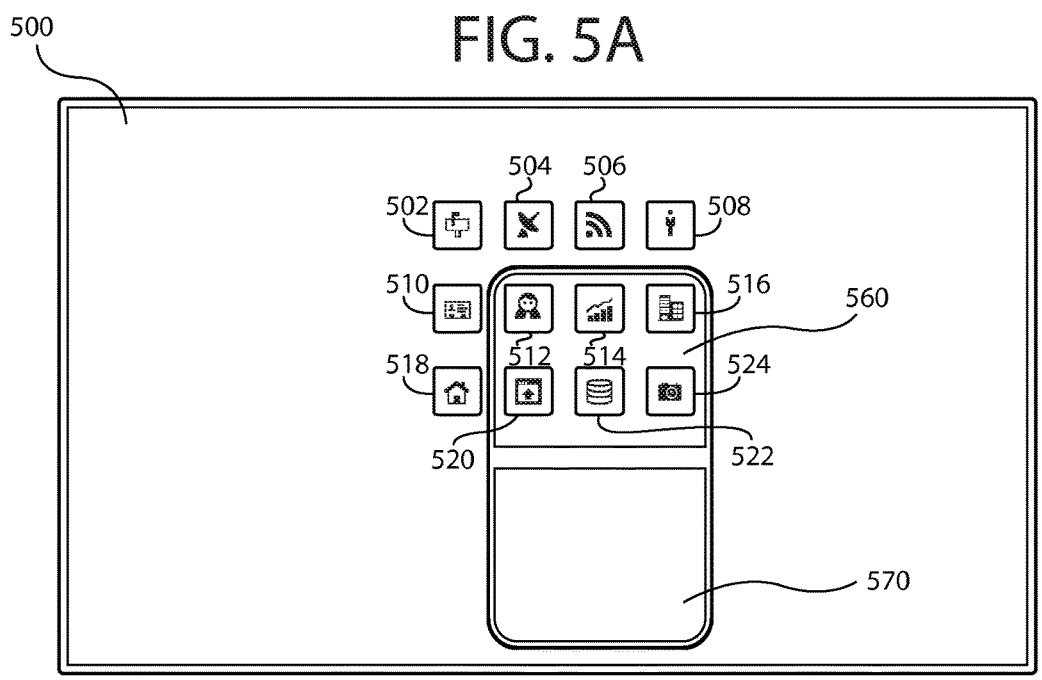
Figure 5C:
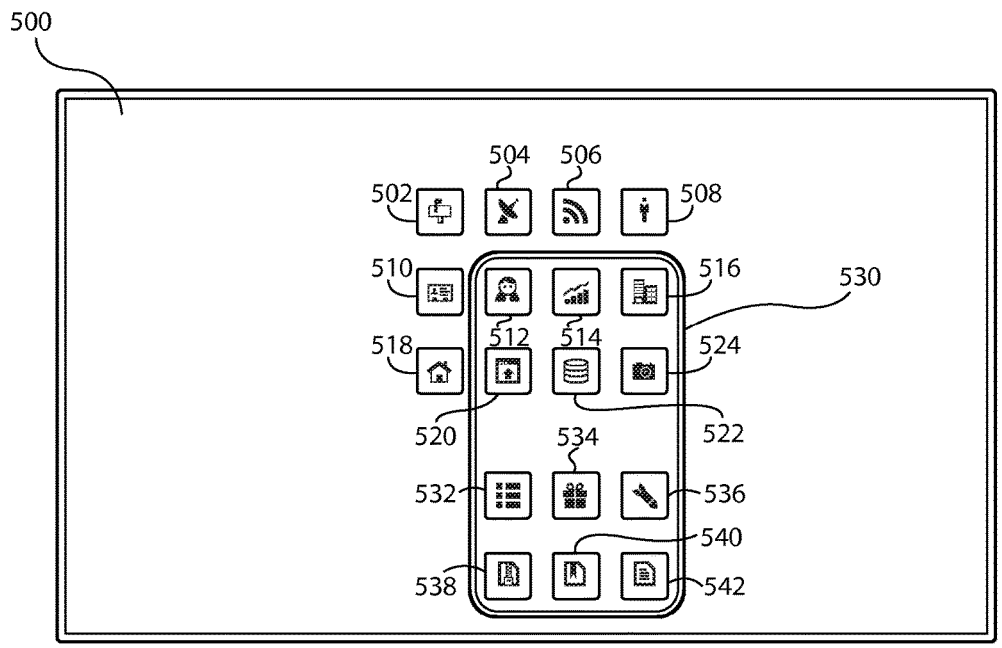

FIGS. 5A-5C are diagrams illustrating display regions according to at least one example embodiment. The examples of FIGS. 5A-5C are merely examples and do not limit the scope of the claims. For example, the number of apparatus may vary, the size of the apparatus may vary, the type of the apparatus may vary, and/or the like.

FIG. 5A illustrates separate apparatus 500. Separate apparatus 500 comprises a separate apparatus display. As can be seen, in the example of FIG. 5A, the separate apparatus display of apparatus 500 is displaying separate apparatus display information elements 502, 504, 506, 508, 510, 512, 514, 516, 518, 520, 522, and 524.

As previously described, in some circumstances, the separate apparatus display may have substantially different dimensions as the see through display. In circumstances such as these, display region directives sent to the separate apparatus may need different parameters, additional parameters, and/or the like. To determine an appropriate display region directive to send to a separate apparatus, it may be desirable for the apparatus to identify a position on the separate apparatus display that substantially aligns with a position of the separate apparatus display region, and dimensions on the separate apparatus display that substantially align with dimensions of the separate apparatus display region.

FIG. 5B illustrates separate apparatus 500. In the example of FIG. 5B, separate apparatus 500 is overlaid with a separate apparatus display region 560, and an apparatus display region 570. An apparatus may send a display region directive to separate apparatus 500 that indicates the position on the separate apparatus display and the dimensions on the separate apparatus display of separate apparatus display region 560 and apparatus display region 570. In at least one example embodiment, the apparatus identifies a position on the separate apparatus display that substantially aligns with a position of the separate apparatus display region. In at least one example embodiment, the apparatus identifies dimensions on the separate apparatus display that substantially align with dimensions of the separate apparatus display region. In at least one example embodiment, the display region directive indicates the position on the separate apparatus display and the dimensions on the separate apparatus display. For example, a display region directive for separate apparatus 500 may indicate the position and dimensions of apparatus display region 560 on separate apparatus 500.

As previously described, a display region directive may be configured to instruct the separate apparatus to display information such that the information aligns with the separate apparatus display region and/or instruct the separate apparatus to terminate display of information that aligns with the apparatus display region. FIG. 5C illustrates apparatus 530 placed on separate apparatus 500, similar to the placement of apparatus 310 on separate apparatus 340 in FIG. 3A. Apparatus 530 comprises a see through display. It can be seen that apparatus 530 is of a smaller dimension than separate apparatus 500. In the example of FIG. 5C, apparatus 530 is displaying see through display information elements 532, 534, 536, 538, 540, and 542 in an apparatus display region of the see through display that correlates with apparatus display region 570 of FIG. 5B. In the example of FIG. 5C, separate apparatus 500 is displaying separate apparatus display information elements 502, 504, 506, 508, 510, 512, 514, 516, 518, 520, 522, and 524. Separate apparatus display information, elements 512, 514, 516, 520, 522, and 524 are visible through a separate apparatus display region of the see through display that corresponds with separate apparatus display region 560 of FIG. 5B.

FIGS. 6A-6E are diagrams illustrating apparatus input according to at least one example embodiment. The examples of FIGS. 6A-6E are merely examples and do not limit the scope of the claims. For example, the input type may vary, the input duration may vary, the input position may vary, and/or the like.

In some circumstances, it may be desirable for the apparatus to receive information indicative of an input. For example, the user of the apparatus may desire to interact with the apparatus, the user may desire to interact with a separate apparatus by way of the apparatus, and/or the like. As such, it may be desirable to configure an apparatus such that a user of the apparatus may indicate a desire to interact with the apparatus, with a separate apparatus, and/or the like, by way of an input associated with the apparatus. For example, a user may desire to interact with a program that is being executed by the apparatus, to access data that is stored in memory comprised by the apparatus, and/or the like. For example, the user may desire to interact with an application, such as image editing software, on the separate apparatus by way of the apparatus when the apparatus is placed on the separate apparatus. In at least one example embodiment, the apparatus receives information indicative of an input. For example, the apparatus may receive information indicative of a touch input to select an operation, a function, and/or the like, that may be available on the separate apparatus.

In some circumstances, it may be desirable to determine that the input has an input position that corresponds with a separate apparatus display region. For example, a separate apparatus display may display information that is viewable through the separate apparatus display region. In such an example, a user may desire to interact with the information that is displayed on the separate apparatus display while the apparatus is placed on the separate apparatus. As such, the user may indicate such a desire by way of an input that is associated with the separate apparatus display region of the see through display. In such an example, an input position that corresponds with the separate apparatus display region may indicate that the user wishes to interact with the separate apparatus. The input position may refer to a discernable position of an input, for example, a start position, an end position, an intermediate position, and/or the like. For example, the apparatus may receive information indicative of a drag input. A drag input may comprise a start position and an end position. A start position may be a position of a cursor when a button is pressed, a position of initiation of a touch input, a position of initiation of a proximity input, and/or the like. An end position may be a position of a cursor when a button is released, a position of termination of a touch input, a position of termination of a proximity input, and/or the like. A drag input may be a touch input, proximity input, cursor input, and/or the like. An input position may correspond with a separate apparatus display region when the input position is received within the separate apparatus display region, included by the separate apparatus display region, and/or the like. In at least one example embodiment, the apparatus determines that an input position corresponds with the separate apparatus display region.

Figure 6A:
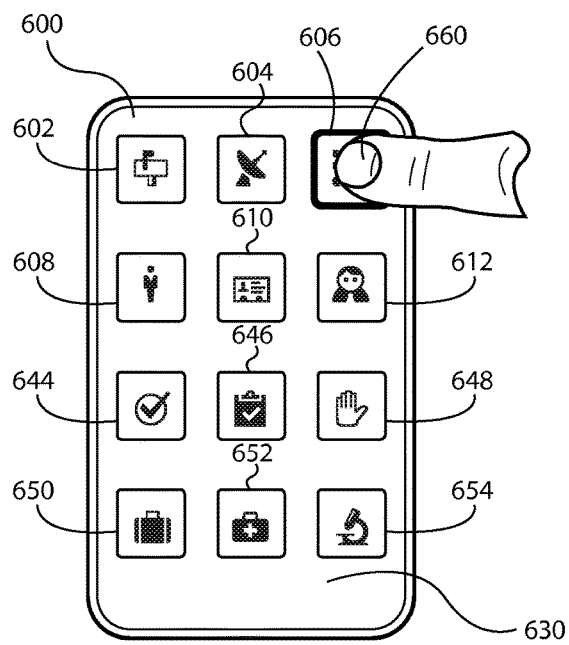
FIGS. 6A-6E are diagrams illustrating apparatus input according to at least one example embodiment.
Figure 6B:
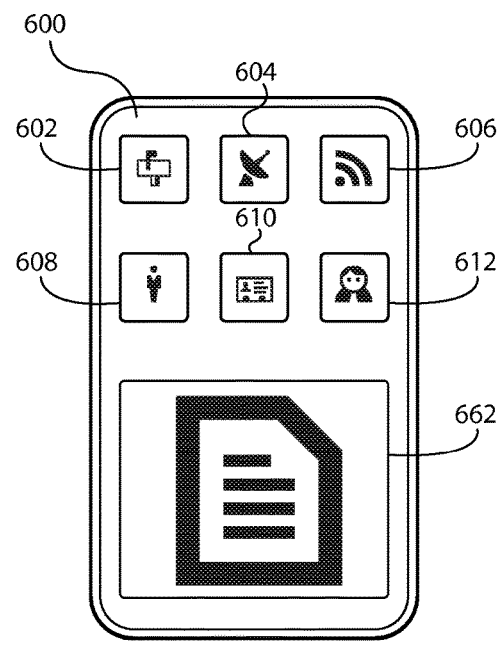
Figure 6C:
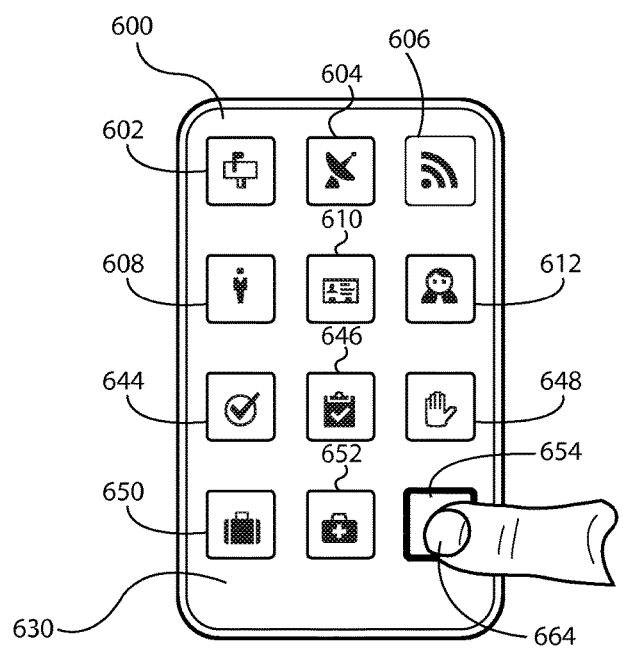

FIG. 6A illustrates apparatus 630 placed on separate apparatus 600, similar to the placement of apparatus 310 on separate apparatus 320 in the example of FIG. 3A. In the example of FIG. 6A, apparatus 630 is displaying see through display information elements 644, 646, 648, 650, 652, and 654 in an apparatus display region of the see through display. In the example of FIG. 6A, separate apparatus 600 is displaying separate apparatus display information elements 602, 604, 606, 608, 610, and 612, which are visible through a separate apparatus display region of the see through display. In the example of FIG. 6A, apparatus 630 is receiving an input 660 within the separate apparatus display region. Even though input 660 is depicted as a touch input, input 660 may be any type of input. For example, input 660 may be a mouse click input, a voice input, and/or the like. Input 660 may indicated a user desire to interact with the apparatus, interact with the separate apparatus, interact with multiple apparatus, and/or the like. In the example of FIG. 6B, apparatus 630 is displaying see through display information element 662 in an apparatus display region of the see through display. It can be seen in the example of FIG. 6B that see through display information element 662 is larger than see through display information elements 644, 646, 648, 650, 652, and 654 FIG. 6A. In the example of FIG. 6C, apparatus 630 is receiving an input 664 within the apparatus display region. Even though input 664 is depicted as a touch input, input 664 may be any type of input. For example, input 664 may be a mouse click input, a voice input, and/or the like. Input 664 may indicated a user desire to interact with the apparatus, interact with the separate apparatus, interact with multiple apparatus, and/or the like.

In some circumstances, it may be desirable to send an operational directive from the apparatus to the separate apparatus based, at least in part, on the determination that the input has an input position that corresponds with the separate apparatus display region. For example, the user may wish to instruct the separate apparatus to perform an operation, to instruct the apparatus to perform an operation on data from the separate apparatus, and/or the like. In at least one example embodiment, the operational directive is configured to instruct the separate apparatus to perform an operation that corresponds with the input. For example, the operation desired by a user may be a move. The input may be associated with the invocation of a move by indicating what should be moved, and where it should be moved. In another example, the input may be associated with the invocation of an open input, in which a file stored on the separate apparatus is opened on the apparatus. In at least one example embodiment, the operational directive comprises information indicative of at least one aspect of the input. The aspect of the input may be an input position, an input duration, an input type, and/or the like. For example, the input duration may indicate a tap input, a drag input, and/or the like. The input may indicate a pass through input. A pass through input may refer to an input received by the apparatus that is intended to control the separate apparatus, determined to be associated with the separate apparatus, and/or the like. For example, the input may indicate a desire for the user to initiate a tap input on the separate apparatus even though the input is received on the apparatus. In at least one example embodiment, the input is a selection input. A selection input may refer to input associated with the selection of a file, an application, a command, and/or the like. In at least one example embodiment, the operational directive comprises information indicative of the selection input at the input position. For example, an operational directive indicative of input 664 of FIG. 6C may comprise information indicating a user desire to select a program associated with see through display information element 654. This may cause the apparatus to launch an application, such as an application associated with see through display information element 662 in FIG. 6B. In some circumstances, it may be desirable to scale an interface element within an allocated display region. For example, a user may be operating an application and wish to see more detail within the application. In circumstances such as these, the apparatus may increase one or more dimensions associated with the displayed size of the information related to the application such that the information increases in scale, is displayed in a region that comprises the entirety of the allocated display region, and/or the like, similar to see through display information element 662 in FIG. 6B. Such an increase in scale may, in some circumstances, require the termination of other display information.

Figure 6D:
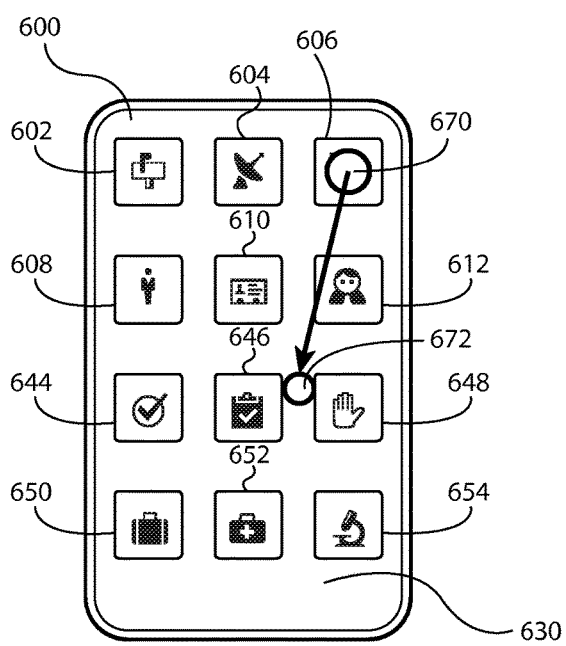

In some circumstances, an apparatus may receive information indicative of a drag input. In at least one example embodiment, the apparatus receives a drag input that comprises a start position that corresponds with the apparatus display region and an end position that corresponds with the separate apparatus display region. For example, the apparatus may receive a drag input similar as described in regards to FIG. 6D. FIG. 6D illustrates apparatus 630 placed on separate apparatus 600, similar to the placement of apparatus 310 on separate apparatus 320 in FIG. 3A. In the example of FIG. 6D, apparatus 630 is displaying see through display information elements 644, 646, 648, 650, 652, and 654 in an apparatus display region of the see through display. In the example of FIG. 6D, separate apparatus 600 is displaying separate apparatus display information elements 602, 604, 606, 608, 610, and 612, which are visible through a separate apparatus display region of the see through display. In the example of FIG. 6D, apparatus 630 is receiving a drag input with a drag input start position 670 within the separate apparatus display region and a drag input end position 672 within the apparatus display region. In some circumstances, the start position may correspond with an interface element. For example, start position 670 of FIG. 6D may correspond with separate apparatus display information element 606.

In some circumstances, a user may desire to interact with particular information that is displayed on a see through display, on a separate apparatus display, and/or the like. In such circumstances, the user may identify the particular information by way of an input, such as a drag input. In such circumstances, the apparatus may identify the particular information based, at least in part, on a start position of the drag input. In at least one example embodiment, the apparatus identifies an interface element that corresponds with the start position. In this manner, the apparatus may send an operational directive that comprises information associated with the interface element, wherein determination of the operational directive is based, at least in part, on the information associated with the interface element. In at least one example embodiment, the determination that the input position corresponds with the separate apparatus display region comprises determination that the end position corresponds with the separate apparatus display region. In at least one example embodiment, the interface element is associated with data stored in memory of the apparatus, and the operational directive instructs the separate apparatus to copy at least part of the data. The data may be any type of data stored on the apparatus, such as a file, a database entry, metadata, and/or the like. For example, the interface element may be associated with a file stored on the apparatus, and the operational directive may instruct the separate apparatus to store a copy of the file received from the apparatus on the separate apparatus. In another example, the interface element may be associated with an image, and the operational directive may instruct the separate apparatus to modify the image. In at least one example embodiment, the operational directive comprises the data.

As previously described, the apparatus may receive a drag input. In at least one example embodiment, the apparatus receives a drag input drag input that comprises a start position that corresponds with the separate apparatus display region and an end position that corresponds with the apparatus display region. In at least one example embodiment, the apparatus sends an operational directive configured to instruct the separate apparatus to identify data associated with the start position and to send the data to the apparatus, wherein determination of the operational directive is based, at least in part, on the start position corresponding with the separate apparatus display region. In at least one example embodiment, the determination that the input position corresponds with the separate apparatus display region comprises determination that the start position corresponds with the separate apparatus display region.

Figure 6E:
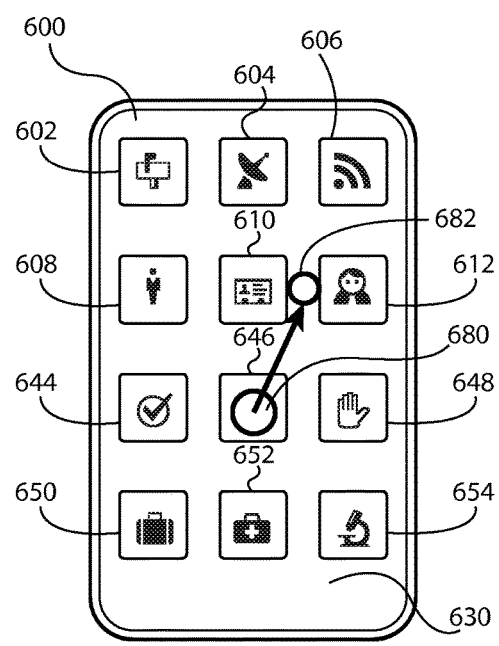

FIG. 6E illustrates apparatus 630 placed on separate apparatus 600, similar to the placement of apparatus 310 on separate apparatus 320 in FIG. 3A. In the example of FIG. 6C, apparatus 630 is displaying see through display information elements 644, 646, 648, 650, 652, and 654 in an apparatus display region of the see through display. In the example of FIG. 6E, separate apparatus 600 is displaying separate apparatus display information elements 602, 604, 606, 608, 610, and 612, which are visible through a separate apparatus display region of the see through display. In the example of FIG. 6E, apparatus 630 is receiving a drag input with a drag input start position 680 within the apparatus display region and a drag input end position 682 within the separate apparatus display region.

In at least some circumstances, it may be desirable for the apparatus to receive data from the separate apparatus. For example, a user may wish to initiate a program on the apparatus associated with an interface element displayed on the separate apparatus display, copy a file from the separate apparatus and/or the like. In at least one example embodiment, the apparatus receives date from the separate apparatus. In at least one example embodiment, the end position of a drag input corresponds with an interface element, and the drag input invokes an operation associated with the interface element such that the operation utilizes the data. For example, a user may drag an image from the apparatus onto an interface element on the separate apparatus associated with an editing application. After the apparatus processes the image, it may send a modified image back to the apparatus. In at least one example embodiment, the apparatus identifies the interface element that corresponds with the end position wherein the invocation of the operation associated with the interface element is based, at least in part, on the identification of the interface element. In at least some circumstances it may be desirable for the apparatus to cause storage of the data. For example, it may be desirable for the apparatus to store data received from the separate apparatus on the apparatus so that the data may be accessed by the apparatus when the apparatus is no longer placed on the separate apparatus. In at least one example embodiment, the apparatus causes storage of the data. For example, the apparatus may cause storage of a file, copying of a database entry, sending of metadata, and/or the like.

Figure 7:
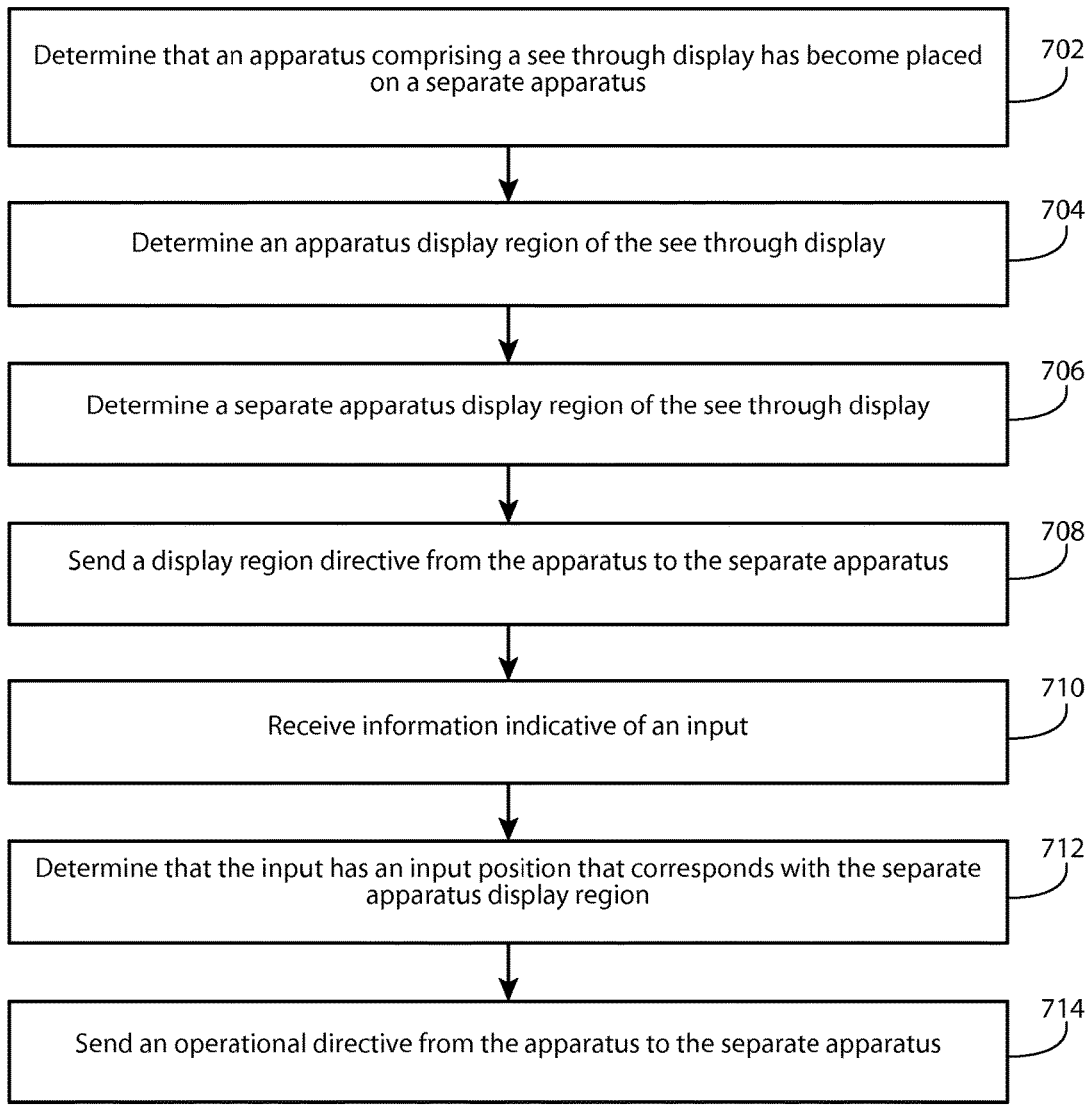
FIG. 7 is a flow diagram illustrating activities associated with determination of an apparatus display region according to at least one example embodiment.

FIG. 7 is a flow diagram illustrating activities associated with determination of an apparatus display region according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines that the apparatus has become placed on a separate apparatus. In at least one example embodiment, the apparatus comprises a see through display. The determination, the apparatus, the separate apparatus, the see through display, and the separate apparatus display may be similar as described regarding FIG. 1, FIG. 2, FIGS. 3A-3C, FIGS. 4A-4C, and FIGS. 5A-5C.

At block 704, the apparatus determines an apparatus display region of the see through display. In this manner, the determination of the apparatus display region may be based, at least in part, on the determination that the apparatus has become placed on the separate apparatus. The determination and the apparatus display region may be similar as described regarding FIGS. 4A-4C, FIGS. 5A-5C, and FIGS. 6A-6E.

At block 706, the apparatus determines a separate apparatus display region of the see through display that is distinct from the apparatus display region. In this manner, the determination of the separate apparatus display region may be based, at least in part, on the determination that the apparatus has become placed on the separate apparatus. The determination and the separate apparatus display region may be similar as described regarding FIGS. 4A-4C, FIGS. 5A-5C, and FIGS. 6A-6E.

At block 708, the apparatus sends a display region directive from the apparatus to the separate apparatus that communicates the separate apparatus display region. In this manner, the sending of the display region directive may be based, at least in part, on the determination of the separate apparatus display region. The determination and the display region directive may be similar as described regarding FIGS. 4A-4C and FIGS. 5A-5C.

At block 710, the apparatus receives information indicative of an input. The receipt and the input may be similar as described regarding FIGS. 6A-6E.

At block 712, the apparatus determines that the input has an input position that corresponds with the separate apparatus display region. The determination and the input position may be similar as described regarding FIGS. 6A-6E.

At block 714, the apparatus sends an operational directive from the apparatus to the separate apparatus. In this manner, the sending of the operational directive may be based, at least in part, on the determination that the input has an input position that corresponds with the separate apparatus display region. The sending and the operational directive may be similar as described regarding FIGS. 6A-6E.

Figure 8:
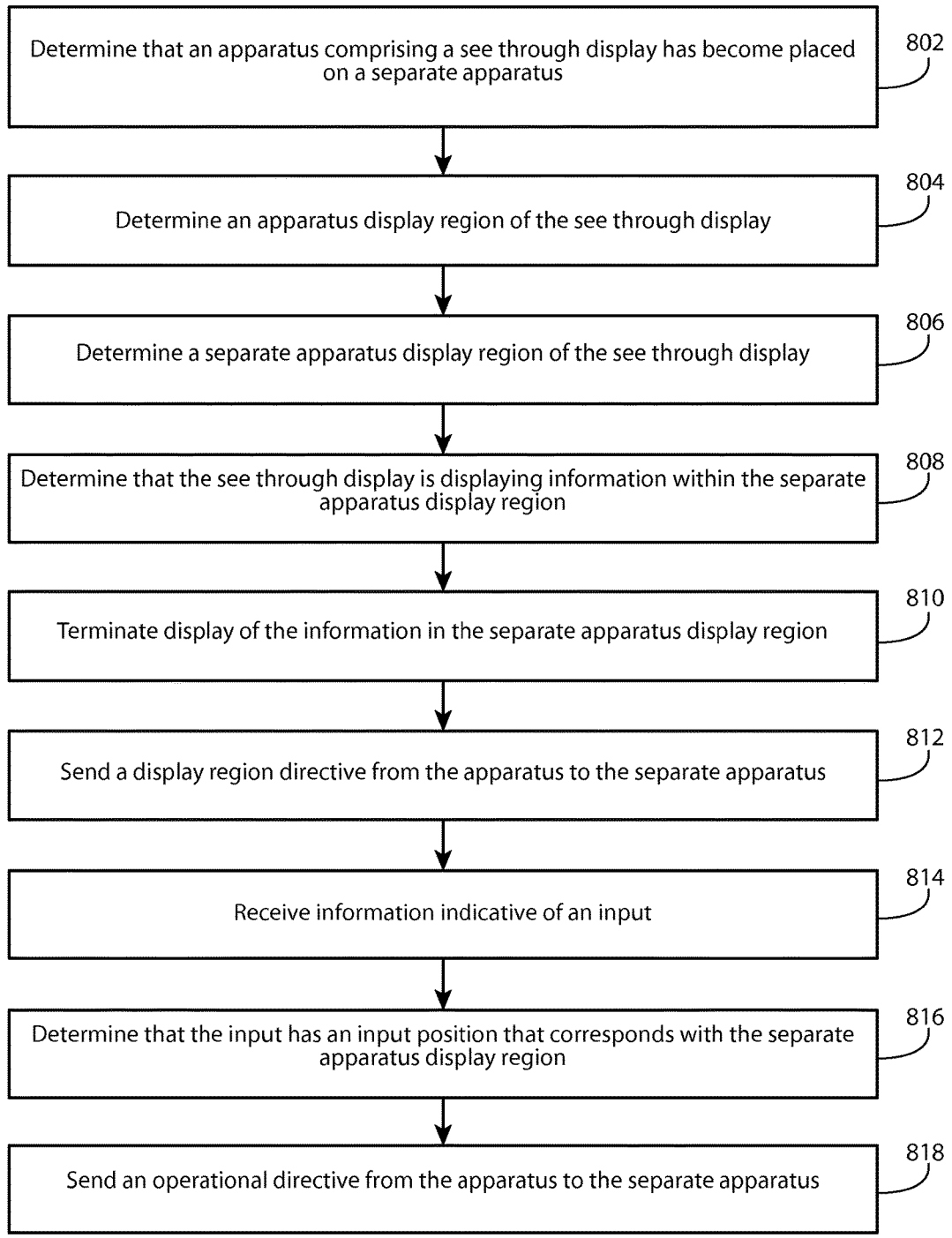
FIG. 8 is a flow diagram illustrating activities associated with termination of display of information according to at least one example embodiment.

FIG. 8 is a flow diagram illustrating activities associated with termination of display of information according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable to terminate display of information displayed within a separate apparatus display region.

At block 802, the apparatus determines that the apparatus has become placed on a separate apparatus, similarly as described regarding block 702 of FIG. 7. In at least one example embodiment, the apparatus comprises a see through display. At block 804, the apparatus determines an apparatus display region of the see through display, similarly as described regarding block 704 of FIG. 7. At block 806, the apparatus determines a separate apparatus display region of the see through display, similarly as described regarding block 706 of FIG. 7.

At block 808, the apparatus determines that the see through display is displaying information within the separate apparatus display region. The determination and the information may be similar as described regarding FIGS. 4A-4C and FIGS. 5A-5C.

At block 810, the apparatus terminates display of the information in the separate apparatus display region. In this manner, the termination of display information may be based, at least in part, on the determination that the information is within the separate apparatus display region. The termination may be similar as described regarding FIGS. 4A-4C and FIGS. 5A-5C.

At block 812, the apparatus sends a display region directive from the apparatus to the separate apparatus, similarly as described regarding block 708 of FIG. 7. At block 814, the apparatus receives information indicative of an input, similarly as described regarding block 710 of FIG. 7. At block 816, the apparatus determines that the input has an input position that corresponds with the separate apparatus display region, similarly as described regarding block 712 of FIG. 7. At block 818, the apparatus sends an operational directive from the apparatus to the separate apparatus, similarly as described regarding block 714 of FIG. 7.

Figure 9:
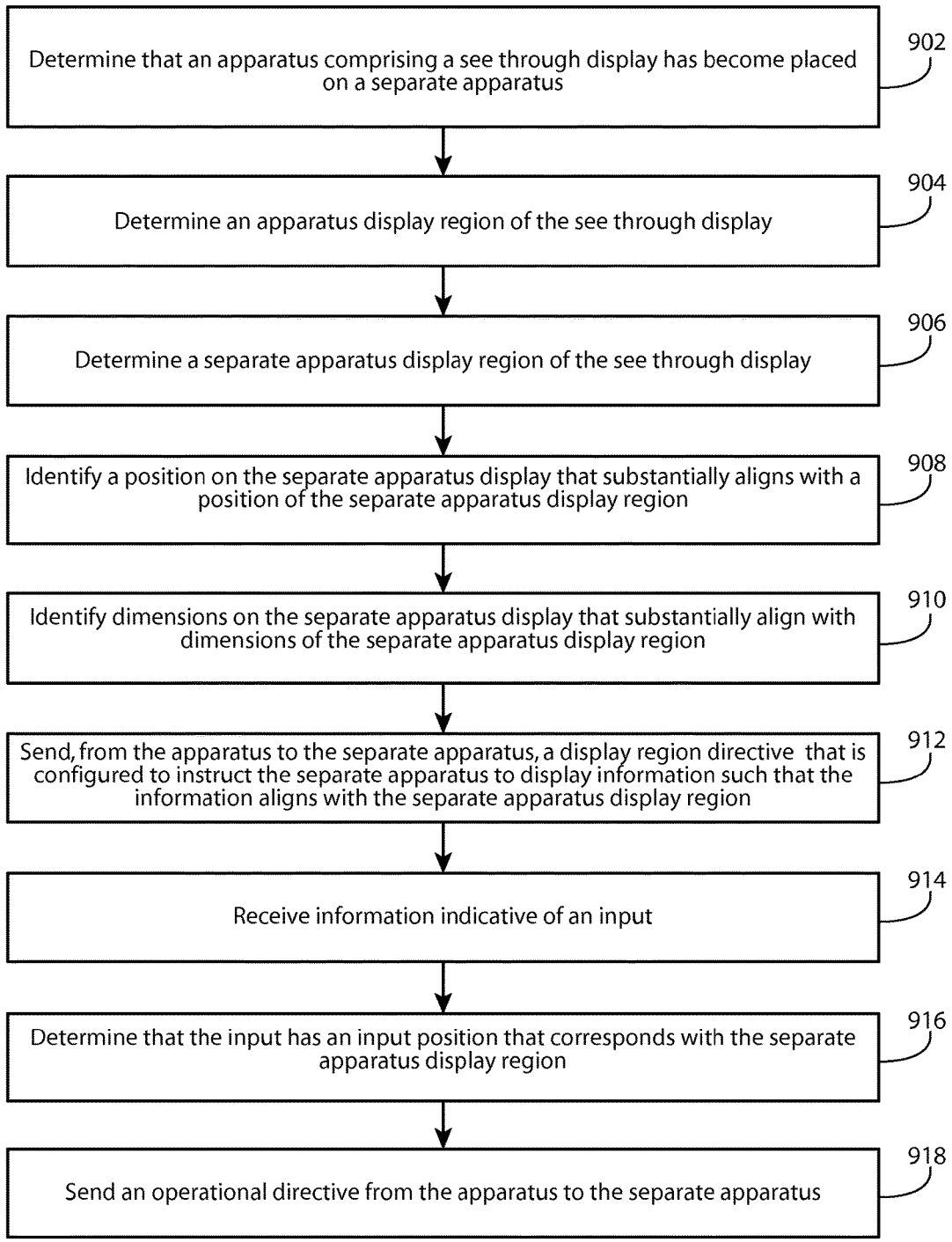
FIG. 9 is a flow diagram illustrating activities associated with display of information according to at least one example embodiment.

FIG. 9 is a flow diagram illustrating activities associated with display of information according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable to display information within an apparatus display region.

At block 902, the apparatus determines that the apparatus has become placed on a separate apparatus, similarly as described regarding block 702 of FIG. 7. In at least one example embodiment, the apparatus comprises a see through display. At block 904, the apparatus determines an apparatus display region of the see through display, similarly as described regarding block 704 of FIG. 7. At block 906, the apparatus determines a separate apparatus display region of the see through display, similarly as described regarding block 706 of FIG. 7.

At block 908, the apparatus identifies a position on the separate apparatus display that substantially aligns with a position of the separate apparatus display region. The identification, the position on the separate apparatus, and the position of the separate apparatus display region may be similar as described regarding FIGS. 3A-3C, FIGS. 4A-4C, and FIGS. 5A-5C.

At block 910, the apparatus identifies dimensions on the separate apparatus display that substantially align with dimensions of the separate apparatus display region. The identification, the dimensions on the separate apparatus, and the dimension of the separate apparatus display region may be similar as described regarding FIGS. 3A-3C, FIGS. 4A-4C, and FIGS. 5A-5C.

At block 912, the apparatus sends a display region directive from the apparatus to the separate apparatus. In at least one example embodiment, the display region directive indicates the position on the separate apparatus display and the dimension on the separate apparatus display. In at least one example embodiment, the display region directive is configured to instruct the separate apparatus to display information such that the information aligns with the separate apparatus display region. In this manner, the sending of the display region directive may be based, at least in part, on the identification of the position on the separate apparatus and the identification of dimensions on the separate apparatus. The sending and the display region directive may be similar as described regarding 4A-4C, and FIGS. 5A-5C.

At block 914, the apparatus receives information indicative of an input, similarly as described regarding block 710 of FIG. 7. At block 916, the apparatus determines that the input has an input position that corresponds with the separate apparatus display region, similarly as described regarding block 712 of FIG. 7. At block 918, the apparatus sends an operational directive from the apparatus to the separate apparatus, similarly as described regarding block 714 of FIG. 7.

Figure 10:
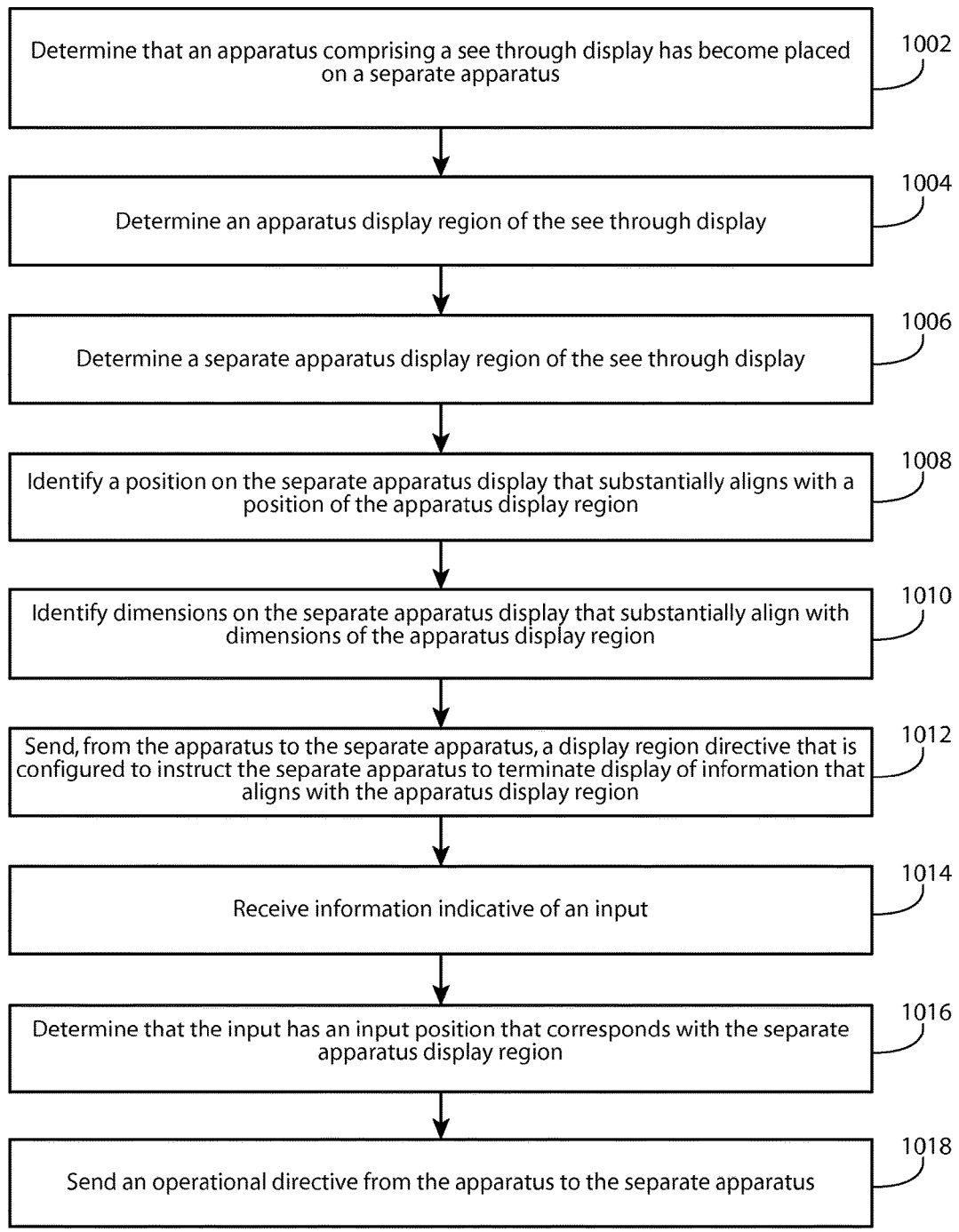
FIG. 10 is a flow diagram illustrating activities associated with termination of display of information according to at least one example embodiment.

FIG. 10 is a flow diagram illustrating activities associated with termination of display of information according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances, it may be desirable to terminate display of information displayed on a separate apparatus display.

At block 1002, the apparatus determines that the apparatus has become placed on a separate apparatus, similarly as described regarding block 702 of FIG. 7. In at least one example embodiment, the apparatus comprises a see through display. At block 1004, the apparatus determines an apparatus display region of the see through display, similarly as described regarding block 704 of FIG. 7. At block 1006, the apparatus determines a separate apparatus display region of the see through display, similarly as described regarding block 706 of FIG. 7. At block 1008, the apparatus identifies a position on the separate apparatus display that substantially aligns with a position of the separate apparatus display region, similarly as described regarding block 908 of FIG. 9. At block 1010, the apparatus identifies dimensions on the separate apparatus display that substantially align with dimensions of the separate apparatus display region, similar as described regarding block 910 of FIG. 9.

At block 1012, the apparatus sends a display region directive from the apparatus to the separate apparatus. In at least one example embodiment, the display region directive is configured to instruct the separate apparatus to terminate display of information that aligns with the separate apparatus display region. In this manner, the sending of the display region directive may be based, at least in part, on the identification of the position on the separate apparatus and the identification of dimensions on the separate apparatus. The sending and the display region directive may be similar as described regarding 4A-4C, and FIGS. 5A-5C.

At block 1014, the apparatus receives information indicative of an input, similarly as described regarding block 710 of FIG. 7. At block 1016, the apparatus determines that the input has an input position that corresponds with the separate apparatus display region, similarly as described regarding block 712 of FIG. 7. At block 1018, the apparatus sends an operational directive from the apparatus to the separate apparatus, similarly as described regarding block 714 of FIG. 7.

Figure 11:
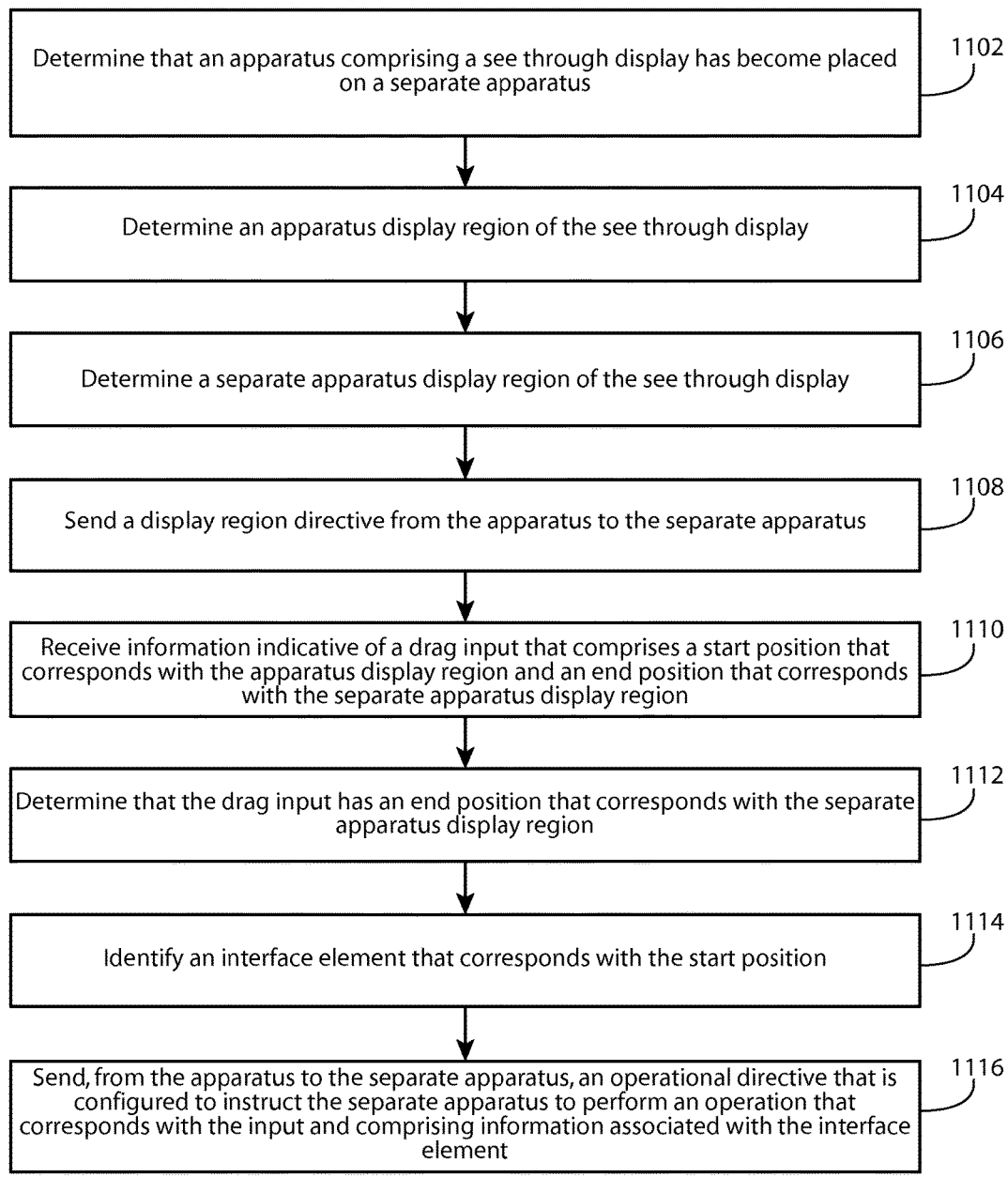
FIG. 11 is a flow diagram illustrating activities associated with sending an operational directive according to at least one example embodiment.

FIG. 11 is a flow diagram illustrating activities associated with sending an operational directive according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances, it may be desirable to send an operational directive to a separate apparatus.

At block 1102, the apparatus determines that the apparatus has become placed on a separate apparatus, similarly as described regarding block 702 of FIG. 7. In at least one example embodiment, the apparatus comprises a see through display. At block 1104, the apparatus determines an apparatus display region of the see through display, similarly as described regarding block 704 of FIG. 7. At block 1106, the apparatus determines a separate apparatus display region of the see through display, similarly as described regarding block 706 of FIG. 7. At block 1108, the apparatus sends a display region directive from the apparatus to the separate apparatus, similarly as described regarding block 708 of FIG. 7.

At block 1110, the apparatus receives information indicative of a drag input. In at least one example embodiment, the drag input comprises a start position that corresponds with the apparatus display region and an end position that corresponds with the separate apparatus display region. The receipt, the drag input, the start position, and the end position may be similar as described regarding FIGS. 6A-6E.

At block 1112, the apparatus determines that the drag input has an end position that corresponds with the separate apparatus display region. The determination may be based, at least in part, on the receipt of information indicative of the drag input. The determination and the end position may be similar as described regarding FIGS. 6A-6E.

At block 1114, the apparatus identifies an interface element that corresponds with the start position. The identification and the interface element may be similar as described regarding FIGS. 4A-4C, FIGS. 5A-5C, and FIGS. 6A-6E.

At block 1116, the apparatus sends an operational directive from the apparatus to the separate apparatus. In at least one example embodiment, the operational directive is configured to instruct the separate apparatus to perform an operation that corresponds with the input. In at least one example embodiment, the operational directive comprises information associated with the interface element. In this manner, the sending of the operational directive may be based, at least in part, on the determination that the drag input has an end position that corresponds with the separate apparatus display region. The sending, the operational directive, and the operation may be similar as described regarding FIGS. 6A-6E.

Figure 12:
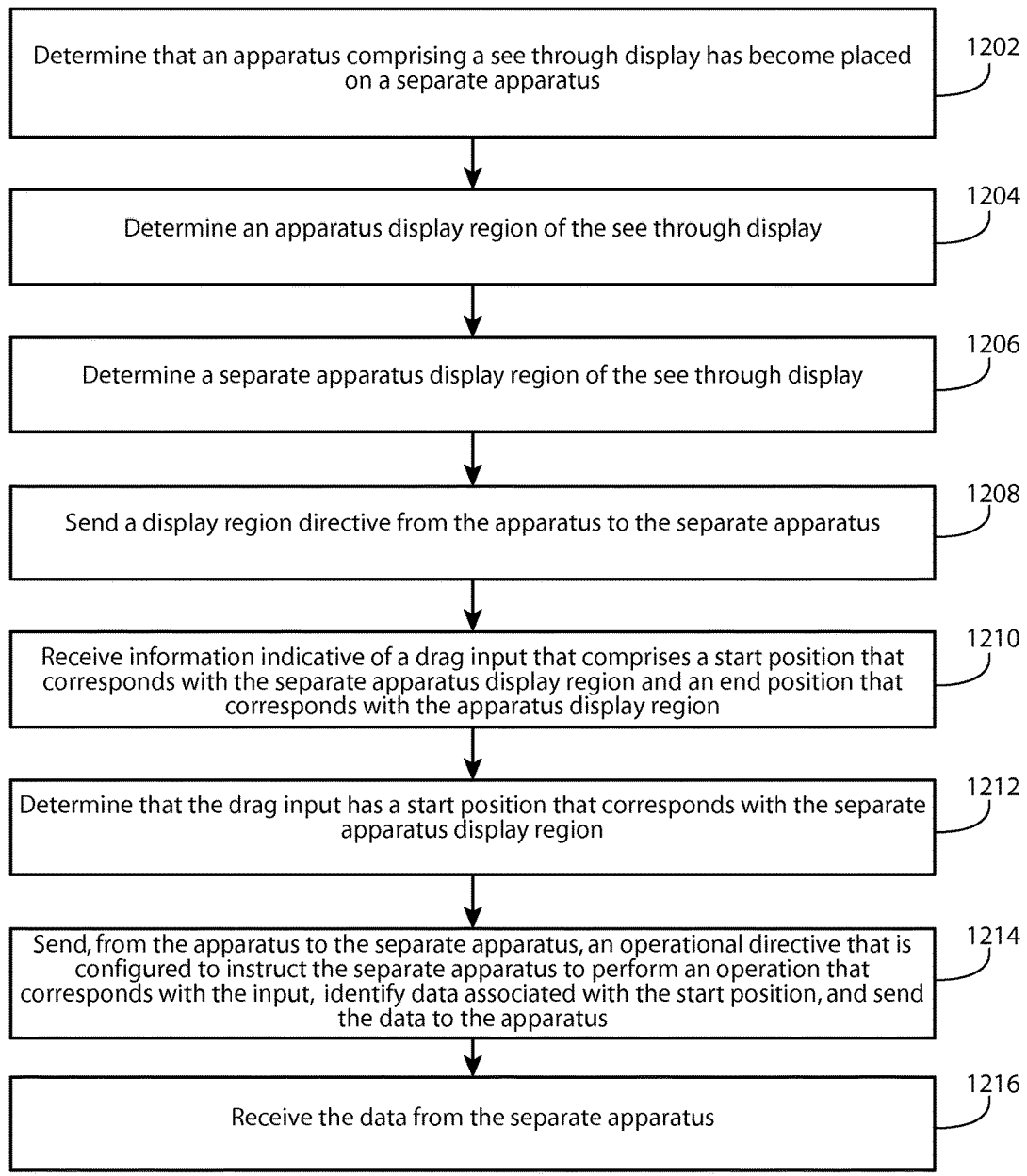
FIG. 12 is a flow diagram illustrating activities associated with receiving data from a separate apparatus according to at least one example embodiment.

FIG. 12 is a flow diagram illustrating activities associated with receiving data from a separate apparatus according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, in some circumstances, it may be desirable to receive data from a separate apparatus.

At block 1202, the apparatus determines that the apparatus has become placed on a separate apparatus, similarly as described regarding block 702 of FIG. 7. In at least one example embodiment, the apparatus comprises a see through display. At block 1204, the apparatus determines an apparatus display region of the see through display, similarly as described regarding block 704 of FIG. 7. At block 1206, the apparatus determines a separate apparatus display region of the see through display, similarly as described regarding block 706 of FIG. 7. At block 1208, the apparatus sends a display region directive from the apparatus to the separate apparatus, similarly as described regarding block 708 of FIG. 7.

At block 1210, the apparatus receives information indicative of a drag input. In at least one example embodiment, the drag input comprises a start position that corresponds with the separate apparatus display region and an end position that corresponds with the apparatus display region. The receipt, the drag input, the start position, and the end position may be similar as described regarding FIGS. 6A-6E.

At block 1212, the apparatus determines that the drag input has a start position that corresponds with the separate apparatus display region. The determination may be based, at least in part, on the receipt of information indicative of the drag input. The determination and the start position may be similar as described regarding FIGS. 6A-6E.

At block 1214, the apparatus sends an operational directive from the apparatus to the separate apparatus. In at least one example embodiment, the operational directive is configured to instruct the separate apparatus to perform an operation that corresponds with the input, identify data associated with the start position, and send the data to the apparatus. In this manner, the sending of the operational directive may be based, at least in part, on the determination that the drag input has a start position that corresponds with the separate apparatus display region. The sending, the operational directive, the operation, and the data may be similar as described regarding FIGS. 6A-6E.

At block 1216, the apparatus receives the data from the separate apparatus. The receipt may be similar as described regarding FIGS. 6A-6E.

Figure 13:
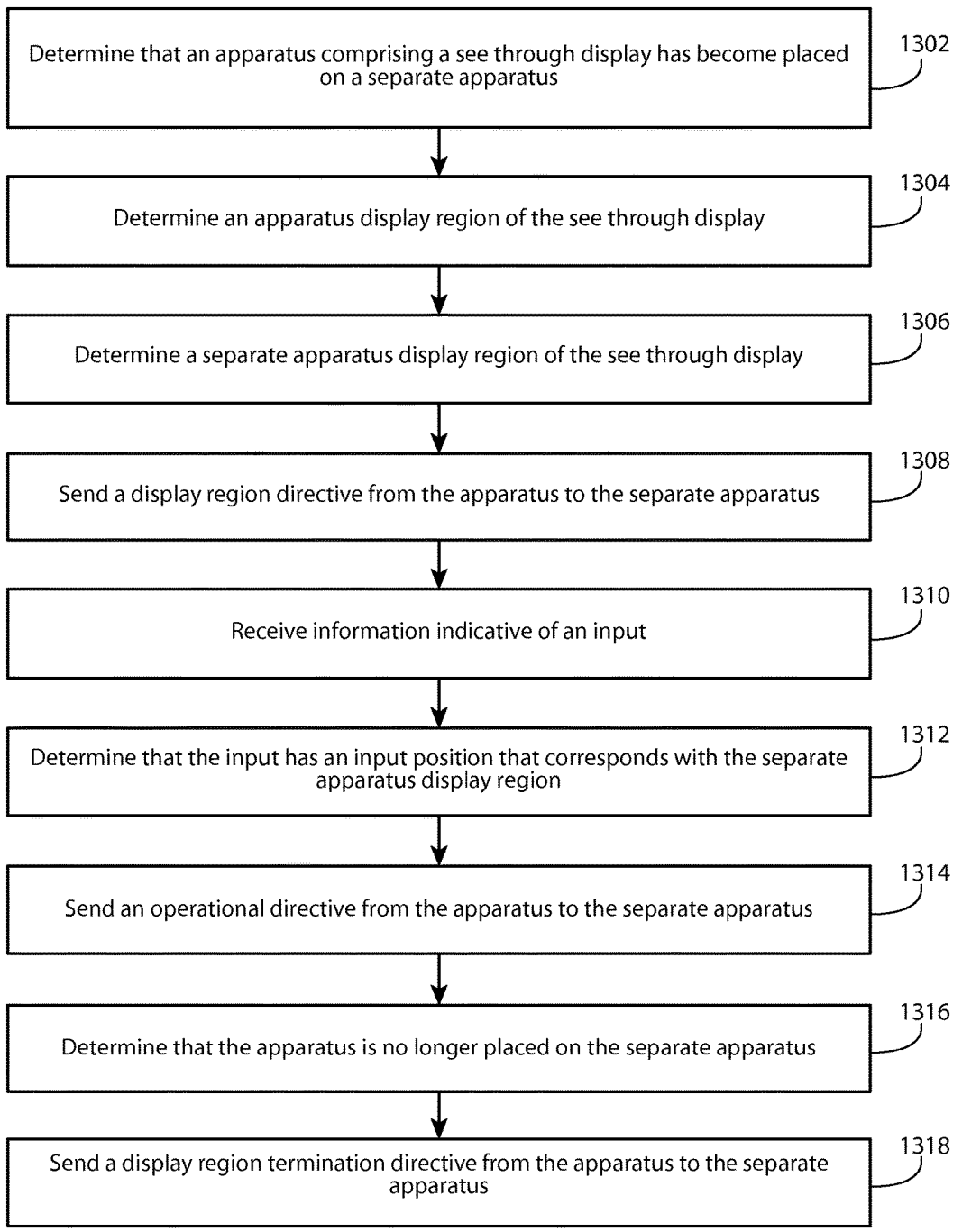
FIG. 13 is a flow diagram illustrating activities associated with sending a display region termination directive according to at least one example embodiment.

FIG. 13 is a flow diagram illustrating activities associated with sending a display region termination directive according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

As previously described, in some circumstances, it may be desirable to send a display region termination directive to a separate apparatus.

At block 1302, the apparatus determines that the apparatus has become placed on a separate apparatus, similarly as described regarding block 702 of FIG. 7. In at least one example embodiment, the apparatus comprises a see through display. At block 1304, the apparatus determines an apparatus display region of the see through display, similarly as described regarding block 704 of FIG. 7. At block 1306, the apparatus determines a separate apparatus display region of the see through display, similarly as described regarding block 706 of FIG. 7. At block 1308, the apparatus sends a display region directive from the apparatus to the separate apparatus, similarly as described regarding block 708 of FIG. 7. At block 1310, the apparatus receives information indicative of an input, similarly as described regarding block 710 of FIG. 7. At block 1312, the apparatus determines that the input has an input position that corresponds with the separate apparatus display region, similarly as described regarding block 712 of FIG. 7. At block 1314, the apparatus sends an operational directive from the apparatus to the separate apparatus, similarly as described regarding block 714 of FIG. 7.

At block 1316, the apparatus determines that the apparatus is no longer placed on the separate apparatus. The determination may be similar as described regarding FIGS. 3A-3C, FIGS. 4A-4C, and FIGS. 5A-5C.

At block 1318, the apparatus sends a display region termination directive from the apparatus to the separate apparatus. In at least one example embodiment, the display region termination directive communicates termination of the separate apparatus display region. In this manner, the sending of the display region termination directive may be based, at least in part, on the determination that the apparatus is no longer placed on the separate apparatus. The sending and the display region termination directive may be similar as described regarding FIGS. 3A-3C, FIGS. 4A-4C, and FIGS. 5A-5C.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 704 of FIG. 7 may be performed after block 706 of FIG. 7. Furthermore, if desired, one or more of the above-described functions may be optional or may be combined. For example, block 704 of FIG. 7 may be optional and/or combined with block 706 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

The invention claimed is:

1. A method comprising:
    determining by an apparatus that comprises a see through display, that the apparatus is on a separate apparatus, the separate apparatus comprising a separate apparatus display;
    determining an apparatus display region of the see through display based, at least in part, on the determination that the apparatus is on the separate apparatus;
    determining a separate apparatus display region of the see through display that is distinct from the apparatus display region;
    sending a display region directive from the apparatus to the separate apparatus that communicates the separate apparatus display region, wherein the display region directive instructs the separate apparatus about how information should be displayed on the separate apparatus display;
    receiving information indicative of an input;
    determining that the input has an input position that corresponds with the separate apparatus display region; and
    sending an operational directive from the apparatus to the separate apparatus based, at least in part, on the determination that the input has an input position that corresponds with the separate apparatus display region.

2. The method of claim 1, further comprising:
    determining that the see through display is displaying information within the separate apparatus display region; and
    terminating display of the information in the separate apparatus display region based, at least in part, on the determination that the information is within the separate apparatus display region.

3. The method of claim 1, wherein the display region directive is configured to instruct the separate apparatus to display information such that the information aligns with the separate apparatus display region.

4. The method of claim 3, wherein dimensions of the separate apparatus display are substantially equal dimensions of the see through display, the determination that the apparatus has been placed on the separate apparatus comprises determination that the see through display substantially aligns with the separate apparatus display, and the display region directive indicates a position of the separate apparatus display region and dimensions of the separate apparatus display region.

5. The method of claim 3, wherein the separate apparatus display has substantially different dimensions as the see through display, and further comprising:
    identifying a position on the separate apparatus display that substantially aligns with a position of the separate apparatus display region; and
    identifying dimensions on the separate apparatus display that substantially align with dimensions of the separate apparatus display region, wherein the display region directive indicates the position on the separate apparatus display and the dimensions on the separate apparatus display.

6. The method of claim 1, wherein the display region directive is configured to instruct the separate apparatus to terminate display of information that aligns with the apparatus display region.

7. The method of claim 6, wherein the separate apparatus display has substantially different dimensions as of the see through display, and further comprising:
    identifying a position on the separate apparatus display that substantially aligns with a position of the apparatus display region; and
    identifying dimensions on the separate apparatus display that substantially align with dimensions of the apparatus display region, wherein the display region directive indicates the position on the separate apparatus display and the dimensions on the separate apparatus display.

8. The method of claim 1, wherein the operational directive is configured to instruct the separate apparatus to perform an operation that corresponds with the input.

9. The method of claim 8, wherein
    the input is a drag input that comprises a start position that corresponds with the apparatus display region and an end position that corresponds with the separate apparatus display region, and further comprising: identifying an interface element that corresponds with the start position, wherein the operational directive comprises information associated with the interface element; or the input is a drag input that comprises a start position that corresponds with the separate apparatus display region and an end position that corresponds with the apparatus display region, and the operational directive is configured to instruct the separate apparatus to identify data associated with the start position and to send the data to the apparatus.

10. The method of claim 9, further comprising receiving the data from the separate apparatus.

11. An apparatus comprising at least one processor and at least one memory, the memory comprising machine-readable instructions, that when executed cause the apparatus to:
determine by the apparatus that comprises a see through display, that the apparatus has become placed on a separate apparatus, the separate apparatus comprising a separate apparatus display;
determine an apparatus display region of the see through display based, at least in part, on the determination that the apparatus has become placed on the separate apparatus;
determine a separate apparatus display region of the see through display that is distinct from the apparatus display region;
send a display region directive from the apparatus to the separate apparatus that communicates the separate apparatus display region, wherein the display region directive instructs the separate apparatus about how information should be displayed on the separate apparatus display;
receiving information indicative of an input;
determine that the input has an input position that corresponds with the separate apparatus display region; and
send an operational directive from the apparatus to the separate apparatus based, at least in part, on the determination that the input has an input position that corresponds with the separate apparatus display region.

12. The apparatus of claim 11, further caused to:
determine that the see through display is displaying information within the separate apparatus display region; and
terminate display of the information in the separate apparatus display region based, at least in part, on the determination that the information is within the separate apparatus display region.

13. The apparatus of claim 12, wherein dimensions of the separate apparatus display are substantially equal dimensions of the see through display, the determination that the apparatus has been placed on the separate apparatus comprises determination that the see through display substantially aligns with the separate apparatus display, and the display region directive indicates a position of the separate apparatus display region and dimensions of the separate apparatus display region.

14. The apparatus of claim 12, wherein the separate apparatus display has substantially different dimensions as the see through display, and the apparatus is further caused to:
identify a position on the separate apparatus display that substantially aligns with a position of the separate apparatus display region; and
identify dimensions on the separate apparatus display that substantially align with dimensions of the separate apparatus display region, wherein the display region directive indicates the position on the separate apparatus display and the dimensions on the separate apparatus display.

15. The apparatus of claim 11, wherein the display region directive is configured to instruct the separate apparatus to display information such that the information aligns with the separate apparatus display region.

16. The apparatus of claim 11, wherein the display region directive is configured to instruct the separate apparatus to terminate display of information that aligns with the apparatus display region.

17. The apparatus of claim 16, wherein the separate apparatus display has substantially different dimensions as the see through display, and the apparatus is further caused to:
identify a position on the separate apparatus display that substantially aligns with a position of the apparatus display region; and
identify dimensions on the separate apparatus display that substantially align with dimensions of the apparatus display region, wherein the display region directive indicates the position on the separate apparatus display and the dimensions on the separate apparatus display.

18. The apparatus of claim 11, wherein the operational directive is configured to instruct the separate apparatus to perform an operation that corresponds with the input.

19. The apparatus of claim 18, wherein
the input is a drag input that comprises a start position that corresponds with the apparatus display region and an end position that corresponds with the separate apparatus display region, and the apparatus is further caused to: identify an interface element that corresponds with the start position, wherein the operational directive comprises information associated with the interface element; or the input is a drag input that comprises a start position that corresponds with the separate apparatus display region and an end position that corresponds with the apparatus display region, and the operational directive is configured to instruct the separate apparatus to identify data associated with the start position and to send the data to the apparatus.

20. At least one non-transitory computer readable medium comprising instructions that, when executed, perform:
determining by an apparatus that comprises a see through display, that the apparatus has become placed on a separate apparatus, the separate apparatus comprising a separate apparatus display;
determining an apparatus display region of the see through display based, at least in part, on the determination that the apparatus has become placed on the separate apparatus;
determining a separate apparatus display region of the see through display that is distinct from the apparatus display region;
sending a display region directive from the apparatus to the separate apparatus that communicates the separate apparatus display region, wherein the display region directive instructs the separate apparatus about how information should be displayed on the separate apparatus display;
receiving information indicative of an input;
determining that the input has an input position that corresponds with the separate apparatus display region; and
sending an operational directive from the apparatus to the separate apparatus based, at least in part, on the determination that the input has an input position that corresponds with the separate apparatus display region.

* * * * *